(12) United States Patent
Sanada et al.

(10) Patent No.: US 7,425,348 B2
(45) Date of Patent: Sep. 16, 2008

(54) SURFACE TREATMENT WITH POLYMER MATERIALS

(75) Inventors: Mikio Sanada, Yokohama (JP);
Sadayuki Sugama, Tsukuba (JP);
Hiroki Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 11/125,205

(22) Filed: May 10, 2005

(65) Prior Publication Data

US 2005/0214468 A1 Sep. 29, 2005

Related U.S. Application Data

(62) Division of application No. 09/725,032, filed on Nov. 29, 2000, now Pat. No. 6,967,059.

(30) Foreign Application Priority Data

Dec. 1, 1999 (JP) ................... 11-342618

(51) Int. Cl.
*B05D 1/00* (2006.01)
(52) U.S. Cl. ................. 427/212; 427/222; 427/384; 427/385.5; 427/387; 427/389.9; 427/394
(58) Field of Classification Search ............... 427/212, 427/222, 384, 385.5, 387, 389.9, 394
See application file for complete search history.

(56) References Cited

U.S. PATENT DOCUMENTS 3,853,601 A 12/1974 Taskier .................. 117/98
4,631,208 A * 12/1986 Westall .................. 427/387
5,300,238 A * 4/1994 Lin et al. ................. 510/520
5,688,855 A 11/1997 Stoy et al. ................ 524/505

(Continued)

FOREIGN PATENT DOCUMENTS

EP 0 281 912 9/1988

(Continued)

OTHER PUBLICATIONS

Patent Abstracts of Japan, vol. 1995, No. 08, Sep. 1995 for JP 07-126555.

(Continued)

*Primary Examiner*—Erma Cameron
(74) *Attorney, Agent, or Firm*—Fitzpatrick, Cella, Harper & Scinto

(57) ABSTRACT

A surface reforming method capable of efficiently carrying out a sustainable, even reforming treatment on a prescribed surface part of an element, a surface treatment liquid to be employed for the above-described method, and an element having a reformed surface treated by the above-described method. A part of the surface of an element is subjected to the reforming treatment by providing the object surface with a polymer, which is different from a constituent material of the objet surface and comprises a first part having a functional group and a second part having an interfacial energy different from that of the functional group and approximately equal to the surface energy of the object surface and orienting the second part of the polymer toward the object surface and orienting the first part in a direction different from the object surface.

12 Claims, 18 Drawing Sheets

U.S. PATENT DOCUMENTS

| | | | | |
|---|---|---|---|---|
| 5,856,392 | A | 1/1999 | Kennedy et al. | 525/479 |
| 5,952,077 | A | 9/1999 | Booth et al. | 428/97 |
| 5,958,988 | A | 9/1999 | Matsushita et al. | 521/49 |
| 5,998,650 | A | 12/1999 | Schrock | 556/423 |
| 6,121,387 | A | 9/2000 | Choudhery | 525/423 |
| 6,623,102 | B2 * | 9/2003 | Sanada et al. | 347/45 |

FOREIGN PATENT DOCUMENTS

| | | |
|---|---|---|
| EP | 0 325 543 | 7/1989 |
| EP | 0 410 485 | 1/1991 |
| EP | 0 491 293 | 6/1992 |
| EP | 0 519 420 | 12/1992 |
| EP | 0 542 485 | 5/1993 |
| JP | 62-267359 | 11/1987 |
| JP | 63-211369 | 9/1988 |
| JP | 1-30637 | 2/1989 |
| WO | WO 92/04409 | 3/1992 |

OTHER PUBLICATIONS

S. Garoff, "Molecular Structure and Interfacial Properties of Surfactant-Coated Surfaces", *Thin Solid Films*, No. 152 (1987) 49-66.

H Ringsdorf, "Oriented Ultrathin Membranes From Monomeric and Polymeric Amphiphiles: Monolayers, Liposomes and Multilayers", *Thin Solid Films*, No. 152 (1987) 207-222.

* cited by examiner

BEFORE CLEAVAGE

CLEAVAGE BY CONCENTRATED ACID

AFTER CLEAVAGE

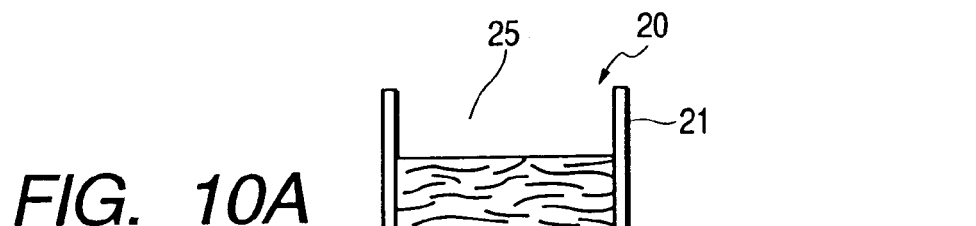
FIG. 10A
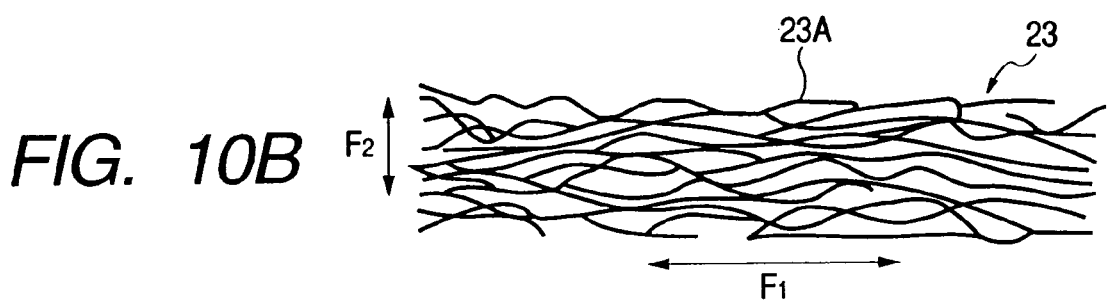
FIG. 10B
FIG. 10C     FIG. 10D
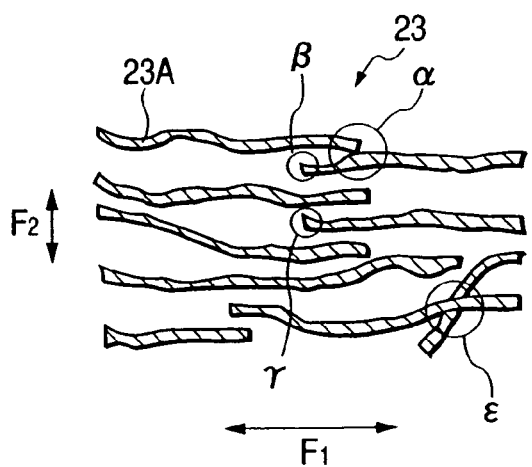   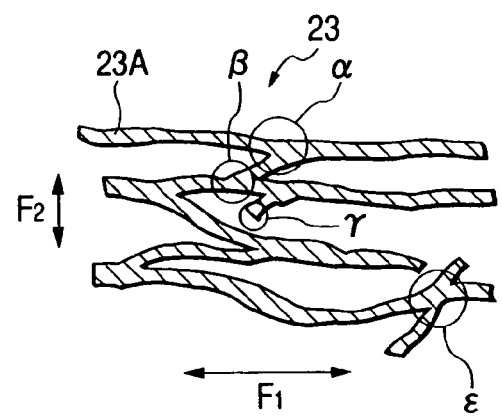
FIG. 11A     FIG. 11B
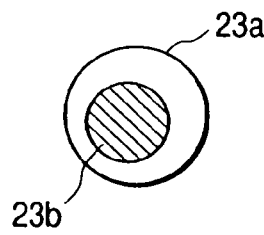   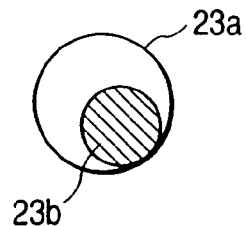

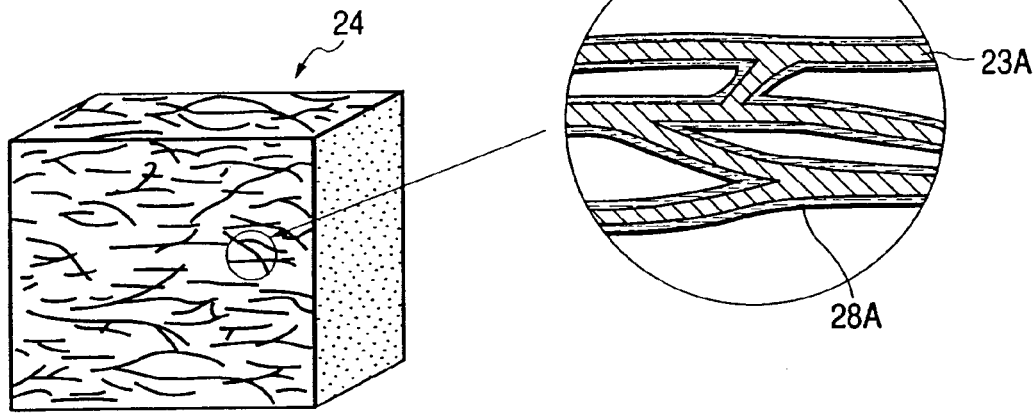
FIG. 13A
FIG. 13D
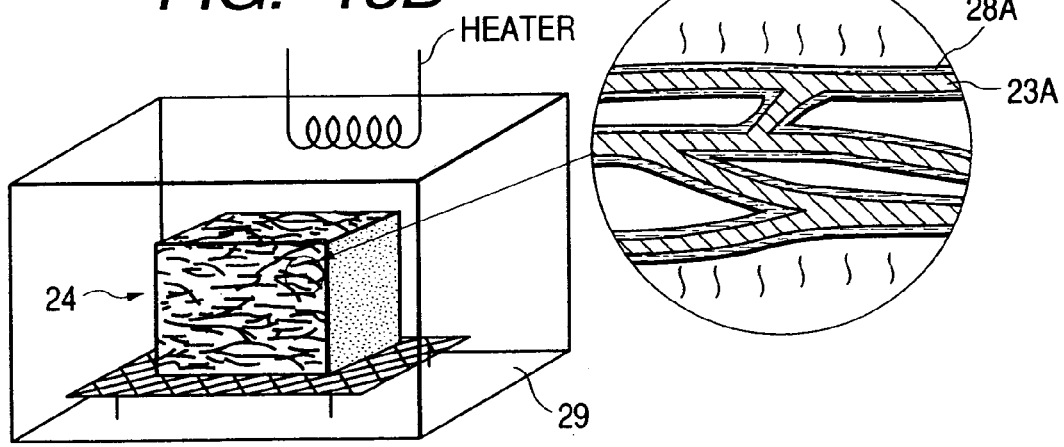
FIG. 13B
FIG. 13E
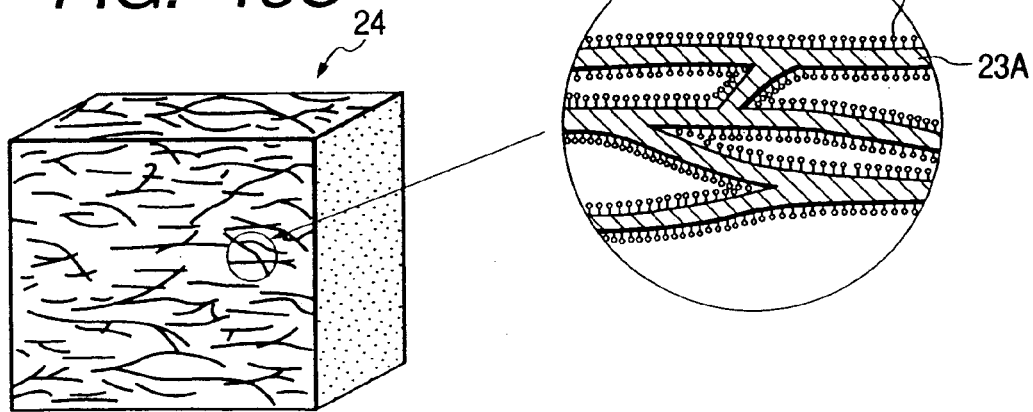
FIG. 13C
FIG. 13F

UNTREATED 150×

UNTREATED 500×

UNTREATED 2000×

ACIDIZED 150×

HYDROPHILICALLY TREATED 150×

HYDROPHILICALLY TREATED 500×

HYDROPHILICALLY TREATED 2000×

SURFACE TREATMENT WITH POLYMER MATERIALS

This Application is a division of application Ser. No. 09/725,032, filed Nov. 29, 2000, which is incorporated herein by reference.

BACKGROUND OF THE INVENTION

1. Field of the Invention

The present invention relates to a method of reforming a surface of an element by changing its characteristics, properties, or the like to provide desired characteristics and properties. This method is applied to the surface of an element (the inner face, outer face, or both of the element) or the surface of an element that has been subjected to some treatment. Also, the present invention relates to any element subjected to the surface reforming treatment.

The present invention especially relates to a surface reforming method, which can be carried out to reliably reform the surface of an element such as a fiber, a particle, or a container made of an olefinic resin that is difficult to treat but is harmless to the environment, and relates to a method of manufacturing an element and a fiber having a reformed surface.

2. Related Background Art

Conventionally, though the characteristics and the properties of an element are dominated by the characteristics of its constituent material, a desired characteristic can be provided by reforming the element's surface. The desired characteristics are, for example, a reactive group having a reactive property such as hydrophobic or hydrophilic, or a group reactive with an adduct or the like.

In general, such conventional surface reforming is carried out by making the surface radical using ozone or UV, or ozone in combination with UV, and forming a chemical bond between a main component of a treatment agent and the surface. On the other hand, a desired characteristic can be obtained by attaching a treatment agent, which itself has a desired characteristic, to the element's surface without making the surface radical. In this case, the continuity is usually lacking. Especially, with respect to hydrophilic properties of an environmentally harmless olefinic resin, it is only known that an incomplete hydrophilic condition, which is insufficient for a long, continuous period, can temporarily be provided by mixing a surfactant with a hydrophobic treatment agent in the presence of a liquid.

On the other hand, an adhesive or a primer is conventionally used to form an additive layer on an element. In that regard, in order to use a primer such as a silane coupling agent which is bonded to the surface of an element only by a chemical reaction, the element has to be treated to be reactive.

As another type of a primer, similar materials to that of an element can be used to utilize the affinity to the element. As such a primer, an acid-deformed polypropylene chloride is known, and is used at the time when an upper coating layer of a polyurethane resin is formed on polypropylene. However, in the case where a primer is made of a similar material to that of the surface of an element, the element's volume increases and an additional technique is required to form a thin and uniform coating. Also, the primer cannot be supplied evenly to a fine element or to the inner parts of a porous body. Especially, the acid-deformed polypropylene chloride cannot be used in an aqueous solution, because it is insoluble in water, and the way of using it is limited.

As a result, no material has been available that is soluble in water so that it can be in an aqueous solution and can be applicable to form a thin and uniform surface reforming layer regardless of the shape of the element, even among materials different from that of the surface of an element.

The present invention is innovative and is based on new findings stemming from the examination of conventional technical standards.

Surface reforming techniques that are based solely on chemical bonding by radicalizing the surface in a conventional manner can only be used to treat an extremely narrow plane but often cannot be applied to carry out sufficient and even surface reforming of the entire spherical surface or the inner or outer surface of a tube. Further, it is especially difficult to carry out the surface reforming treatment for the inside of an element comprising a complicated, porous portion such as a sponge, fibrous composite body, and void parts among fibers.

In addition, in the case where a surfactant or the like is added to a liquid, the surface reforming of an element is not actually carried out and the specific surface characteristic is lost at the time when the surfactant is eliminated and the original characteristic of the surface itself instantaneously reappears.

Moreover, though an olefinic resin has excellent water-repelling properties, i.e., the contact angle with water is 80 degrees or greater, it is utilized in almost all fields and is applicable to a considerably wide range of uses, the surface reforming method is hardly able to provide desired and durable surface characteristics.

The present invention provides a method for reforming a surface of any element by rationally carrying out surface reforming, at first, of an olefinic resin and explicating a method for maintaining the reformed characteristic and focuses upon the use of a liquid phase treatment solution presupposing that the surface treatment is possible even for an element with a complicated shape.

The inventors have found that the balance between functional groups (e.g. hydrophilic groups) and the surface of an element to be treated is well controlled to be in a desired state by utilizing the surface energy in a relation between the surface to be treated and a polymer having the functional groups (e.g. hydrophilic groups), and that the durability of the reformed surface and the stability of the quality can further be heightened by analyzing the polymer itself.

SUMMARY OF THE INVENTION

The following is the description of the technological objects to be solved by the present invention. The present invention is neither (I) processing an element in the above-described manner by forming free radicals with ozone or UV rays nor (ii) forming a primer coating using, for example, a silane coupling agent, which sometimes causes coating unevenness. The present invention aims mainly to provide an innovative surface reforming method capable of carrying out desired surface reforming based on a new mechanism and a treatment solution to be used for the method, to provide an element obtained by the method, and to provide the surface structure itself obtained by the surface treatment.

A first purpose of the present invention is to provide a liquid-phase treatment solution capable of carrying out a desired surface treatment of an entire inner surface of an element having a complicated shape, such as a porous body and a finely processed element, and a surface reforming method using the treatment solution.

A second purpose of the present invention is to provide a new surface reforming method capable of maintaining the reformed characteristic for a long period of time as compared with a conventional method for an olefinic resin, the surface of which is known to be difficult to treat, and to provide a surface structure itself.

A third purpose of the present invention is to provide a new surface reforming method capable of forming a layer with a thickness on a molecular level, preferably a monomolecular level, as a reformed surface itself without changing the structure of an element or with scarcely increasing the weight of the element and to provide a surface structure itself.

A fourth purpose of the present invention is to provide a treatment method with which a desired reforming can freely be carried out by introducing a new mechanism into a surface reforming method.

A fifth purpose of the present invention is to provide a method for easily manufacturing a surface-reformed element at high productivity.

A sixth purpose of the present invention is to provide an innovative method for reforming an element's surface utilizing interfacial physical adsorption based on an energy level approximately similar to cleaving of a polymer from the view point of interfacial energy of a group (or groups) of the polymer.

A seventh purpose of the present invention is to provide an innovative surface reforming method capable of evenly reforming a circumference of an element and, at the same time, to provide a surface structure that has not been obtained in a conventional manner from the view point of the entire circumference of the surface structure itself.

Other purposes of the present invention may be understood from the following descriptions, and the present invention can achieve compounded purposes in an optional combination of the above-described respective purposes.

The following aspects are included in the present invention in order to achieve the above-described purposes.

One aspect of a surface reforming method of the present invention is a method for reforming a part of a surface by providing a partial surface, which composes at least a part of the surface of a prescribed element, to be subjected to surface reforming with a functional group. The method is characterized in that the supply of the functional group to the partial surface is carried out by a method involving a first step of supplying, to the partial surface, a liquid containing a polymer, which is different from a constituent material of the partial surface and which composes a first part having a functional group, and a second part having a group with an interfacial energy that is approximately equal to the surface energy of the partial surface but different from the interfacial energy of the forgoing functional group and a second step of orienting the second part of the polymer toward the partial surface and orienting the first part toward a different side from the partial surface.

Another aspect of a surface reforming method according to the present invention is a method for reforming a part of the surface by providing a partial surface, which composes at least a part of the surface of a prescribed element, to be subjected to the surface reforming with a functional group. This method is characterized in that the functional group is supplied to the partial surface by a method involving a first step of supplying, to the partial surface, a liquid containing fractionalized (fragmented) products, which are obtained by cleaving of a polymer composing a first part having the above-described functional group and a second part having a group with an interfacial energy that is approximately equal to the surface energy of the partial surface but different from the interfacial energy of the forgoing functional group and which contain the first part and the second part, a second step of orienting the second part of the fractionalized products toward the partial surface and orienting the first part toward a different side from the partial surface, and a third step of at least partially polymerizing the fractionalized products oriented on the partial surface by condensation polymerization.

One aspect of an element having the surface reformed in accordance with a method of the present invention is an element provided with a polymer compound in a partial surface composing at least a part of the surface and is characterized in that the polymer compound is a material that is either soluble in a solvent or has a main skeleton different from the material at least partially composing the forgoing partial surface and which comprises a first part having a functional group for reforming the partial surface and a second part having the interfacial energy different from the interfacial energy of the functional group and approximately equal to the surface energy of the partial surface. The second part is oriented toward the partial surface and the first part is oriented in a direction different from that of the partial surface.

Another aspect of an element having the surface reformed in accordance with a method of the present invention is an element provided with a polymer compound in a face made of a polymer material having 80° or greater contact angle with water. The element is characterized in that the polymer compound is a material that is either soluble in a solvent or has a main skeletal structure different from the polymer material and which comprises a first part having a hydrophilic group and a second part having the interfacial energy lower than the interfacial energy of the hydrophilic group and approximately equal to the surface energy of the face made of the polymer material, and the second part is oriented toward the face made of the polymer material and the first part is oriented in the direction different from that of the face made of the polymer material to impart hydrophilic properties onto the face made of the polymer material.

A fibrous body with a reformed surface formed in accordance with the present invention is a fibrous body made of a fiber, having an olefinic resin at least in the surface and provided with a polymer compound in the surface. The fibrous body is characterized in that the polymer compound is a material that is either soluble in a solvent or has a main skeletal structure different from the material forming the surface and which is a polyalkylsiloxane comprising a hydrophilic group and the alkyl group of the polyalkylsiloxane is oriented toward the surface and the hydrophilic group is oriented in a direction different from the surface side to provide the surface with hydrophilic properties.

One aspect of a method for manufacturing a fiber with a reformed surface in accordance with the present invention is a method of manufacturing a fiber having an olefinic resin at least in the surface and provided with a reformed surface having hydrophilic properties. This method comprises a first step of supplying a solution containing a dissolved alkylsiloxane polymer having a hydrophilic group to the surface and a second step of orienting the alkylsiloxane to the surface and orienting the hydrophilic group in a different direction from the surface.

Another aspect of a method of manufacturing a fiber with a reformed surface in accordance with the present invention is a method of manufacturing a fiber having an olefinic resin at least in the surface and provided with a reformed surface having hydrophilic properties in the above-described surface. This method comprises a first step of supplying to the surface a solution containing dissolved fractionalized products obtained by cleaving of an alkylsiloxane polymer having a hydrophilic group and a second step of condensing the fractionalized products on the surface, orienting the alkylsiloxane to the surface and orienting the hydrophilic group in the different direction from the surface.

Another aspect of a method of manufacturing a fiber with a reformed surface in accordance with the present invention is a method of manufacturing a fiber having an olefinic resin at least in the surface and provided with a reformed surface having hydrophilic properties. This method comprises a step of forming a fiber surface coated with a treatment solution containing a polyalkylsiloxane having a hydrophilic group, an acid, and an alcohol and a step of drying the treatment solution coating the fiber surface at a temperature higher than room temperature.

Another aspect of a method of manufacturing a fiber with a reformed surface in accordance with the present invention is a method of manufacturing a fiber having an olefinic resin at least in the surface and provided with a reformed surface having hydrophilic properties and is characterized by comprising a step of forming a fiber surface coated with a treatment solution containing a polyalkylsiloxane having a hydrophilic group, an acid, an alcohol, and water and a step of drying the treatment solution coating the fiber surface while making the surface hydrophilic by orienting the hydrophilic group in a direction opposite to the surface.

Another aspect of a surface reforming method according to the present invention is a surface reforming method of the surface of a prescribed element, which method comprises a first step of supplying, to the surface, a liquid containing a diluted sulfuric acid, a volatile agent for reforming the affinity with the element's surface and a treatment agent of a polymer comprising a second part having a group with an interfacial energy approximately equal to the surface energy of the above-described surface and a first part having a group with an interfacial energy different from the above-described interfacial energy, a second step of removing the agent for reforming the affinity by heating the resultant surface, a third step of cleaving the polymer in the treatment agent by concentrating the diluted sulfuric acid to a concentrated sulfuric acid, and a fourth step of condensing the ring-opened polymer on the surface and at the same time orienting the second part of the polymer toward the surface and orienting the first part to a side different from the surface.

Another aspect of a surface reforming method according to the present invention is a method for reforming the surface of an element by introducing a functional group to the forgoing surface, which method is characterized by involving a step of condensing fractionalized products comprising a second part having a group with an interfacial energy approximately equal to the surface energy of the surface and a first part having the functional group and obtaining, by cleaving, a polymer compound having the first part and the second part so that the fractionalized products are oriented based on the affinity of the group having the interfacial energy approximately equal to the surface energy with the surface.

Another aspect of an element having a surface reformed by the present invention is an element having a reformed surface into which a functional group is introduced. This element has a condensate substance of fractionalized products in the surface. The fractionalized products comprise a second part having a group with an interfacial energy approximately equal to the surface energy of the surface and a first part having a functional group and obtained by cleaving a polymer compound having the first part and the second part. The fractionalized products are condensed so that they are oriented based on the affinity of the group having the interfacial energy approximately equal to the surface energy with the surface.

Another aspect of an element having a surface reformed by the present invention is an element having a circumferential part of a curved face forming a closed circular shape as an outer circumferential cross-section. This element is characterized in that the outer circumferential part has a portion coated with a film containing a polymer and circularly surrounded with the film in one closed turn to reform the forgoing surface part. The polymeric compound is a material that is soluble in a solvent or has a main skeletal structure different from the material of the surface of the element and which comprises a first part having a functional group for reforming the surface and a second part having the interfacial energy different from that of the functional group and approximately equal to the surface energy of the surface. The second part is oriented toward the surface and the first part is oriented in a direction different from that of the surface.

Another aspect of a surface reforming method of the present invention is a method for reforming the hydrophobic surface of an element to make it hydrophilic. This method comprises a step of attaching, to the hydrophobic surface, fractionalized products comprising a hydrophilic group and a hydrophobic group. The fractionalized products are obtained by cleaving a polymer compound having the hydrophilic group and the hydrophobic group. The hydrophobic group is oriented in the surface side of the hydrophobic surface and the hydrophilic group is oriented in a direction different from that of the hydrophobic group.

Another aspect of an element having a surface reformed in accordance with the present invention is an element having a hydrophobic surface that is reformed to be hydrophilic. Fractionalized products comprising a hydrophilic group and a hydrophobic group, which are obtained by cleaving a polymer compound having the hydrophilic group and the hydrophobic group, are attached so that the hydrophobic group is oriented in the surface side of the hydrophobic surface and the hydrophilic group is oriented in a direction different from that of the hydrophobic group.

A surface treatment solution to be used for the surface reforming according to the present invention is a solution that supplies a functional group. This solution is characterized by containing a polymer provided with a first part having a functional group and a second part having the interfacial energy different from that of the functional group and approximately equal to the surface energy of the partial surface, a volatile solvent having sufficient wettability to the element and being a good solvent for the polymer and being able to serve as catalyst for cleaving the polymer.

The surface treatment solution may further contain a volatile solvent that is not wettable to the element and is a good solvent for the polymer. A method of producing such a surface treatment solution is characterized by dissolving the polymer in a volatile solvent having sufficient wettability to the element and being a good solvent for the polymer and then mixing a volatile solvent having no wettability to the element and being a good solvent for the polymer to the resultant solution.

Another aspect of a surface reforming method according to the present invention is a method for carrying out surface reforming for a partial surface of an element, which method is characterized by reforming the surface by carrying out, on the partial surface, condensation polymerization of ring-opened polymers oriented based on the affinity of the interfacial energy of a group similar to the surface energy of the partial surface of the element.

Another aspect of a surface reforming method according to the present invention is a method for reforming a partial surface of an element using a liquid-phase polymer. This method is characterized by involving a condensation step carried out on the partial surface by condensation-polymerizing fractionalized products of a polymer, which comprises a first group having a functional group that can undergo a ring-opening and can be condensation polymerizable and a second group having an interfacial energy that is approximately equal to the surface energy of the partial surface of the element.

Another aspect of an element of the present invention is an element that has a surface comprising at least an olefinic resin. The surface is reformed by being made hydrophilic and is characterized by having a liquid-contacting surface structure having, practically in a reciprocal fashion, a hydrophilic group with a relatively long chain and a hydrophobic group with a relatively short chain. This reformed surface is formed by coating the surface with a treatment solution containing a polymer having a hydrophilic group and a group with an interfacial energy approximately equal to the surface energy of the element surface comprising at least the olefinic resin as a constituent component, a diluted sulfuric acid as a cleaving catalyst for the polymer, and an alcohol, evaporating the treatment solution coating the element surface and simultaneously concentrating the diluted sulfuric acid to be a concentrated sulfuric acid on the element surface to ring-open the polymer, and then condensation-polymerizing the ring-opened products.

BRIEF DESCRIPTION OF THE DRAWINGS

FIG. 1A illustrates the case where a polymer has a first group as a functional group and a second group for adhering to the element surface both in the side chains. FIG. 1B is a figure illustrating the case where the second group is contained in the main chain;

FIG. 9A is a schematic illustration of the untreated inner wall face of the PP container. FIG. 9B is a schematic illustration of the inner wall face coated with a hydrophilic agent following the hydrophilic treatment;

FIGS. 10A, 10B, 10C and 10D are illustrations of a PE/PP fibrous body usable for an ink absorbent in an ink tank. FIG. 10A is a schematic illustration of utilizing an ink absorbent in an ink tank. FIG. 10B, FIG. 10C. FIG. 10D are, respectively, schematic illustrations of the entire shape of the PE/PP fibrous body and the orientation direction F1 of the fibers and the direction F2 perpendicular to the direction F1, the PE/PP fibrous body in the state before formation by thermal fusion, and the PE/PP fibrous body in the state after formation by thermal fusion;

FIGS. 11A and 11B are one example of a cross-section of a PE/PP fibrous body shown in the FIGS. 10A to 10D. FIG. 11A is an example of approximately concentrical coating of a PP core material with a PE sheath material. FIG. 11B is a schematic illustration of the example of eccentrically coated PP core material with a PE sheath material;

FIG. 12A is a schematic of an untreated fibrous body. FIG. 12B schematically illustrates the step of immersing the fibrous body in a treatment solution for making the surface hydrophilic. FIG. 12C schematically illustrates the step of pressurizing the fibrous body after immersion and removal of the excess treatment solution. FIGS. 12D to 12F are partially magnified figures of FIGS. 12A to 12C, respectively;

FIGS. 13A, 13B, 13C, 13D, 13E and 13F illustrate the steps successive to the steps illustrated in FIGS. 12A to 12C. FIG. 13A is a schematic illustration of the coating layer formed on the surface of a fibrous body. FIG. 13B schematically illustrates the step of drying and removing a solvent contained in the coating layer. FIG. 13C is a schematic illustrating the coating on the surface of the fibrous body with an agent for making the surface hydrophilic. FIGS. 13D to 13F are partially magnified FIGS. 13A to 13C, respectively;

FIG. 21A is a schematic of an untreated PP fine particle. FIGS. 21B and 21C are respectively schematics illustrating the PP fine particle coated with an agent for making the surface hydrophilic. FIG. 21D is a schematic illustrating the coating containing the agent for making the surface hydrophilic and formed on the surface, which is a curved plane of the fine particle;

DESCRIPTION OF THE PREFERRED EMBODIMENTS

Figure 1A:
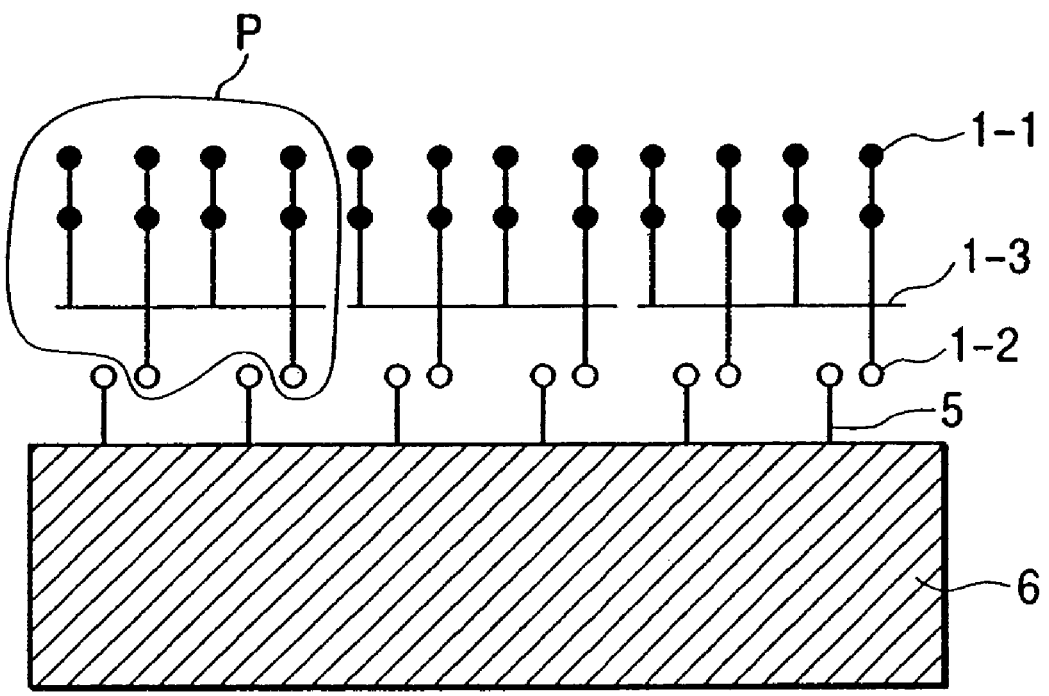
FIGS. 1A and 1B are schematic illustrations of the adhesion state of a polymer as a surface reforming agent formed on the object surface of an element (a substrate) to be reformed by a surface treatment method of the present invention.

The surface modification method of the present invention allows to attain the desired surface modification of an element by attaching a polymer (or a finely fractionalized (fragmented) product thereof) to the surface of the element in a specific orientation, utilizing the functional group or the like, of the material constituting the element, to impart the properties associated with the polymer (or a finely fractionalized product thereof) to the surface.

The "element," as used herein, means a structure made of various materials and having a specific external shape. It has an exposed external surface associated with the external shape. Moreover, it may contain voids, cavities or hollows, each containing the section, which is in communication with the outside. The internal surface (internal wall surface), which divides the section, may be the partial surface to be treated by the surface modification method of the present invention. The hollow may have an internal surface by which it is fractionalized, and may be completely isolated from the outside. However, such a hollow can be subjected to the treatment by the present invention, so long as the surface treatment solution can be applied to its inside before the modification treatment and the hollow becomes isolated from the outside after the treatment.

The surface modification method of the present invention is applicable to any surface of an element with which the surface treatment solution can be brought into contact from the outside without damaging the shape of the element. The partial surface to be treated includes an external surface of the element, internal surface in communication therewith, and both of these surfaces. Modification of properties of partial surface(s) selected and fractionalized from the surface to be treated is within the scope of the present invention. Depending on the selection, the embodiment selecting the external surface of an element and its internal surface in communication therewith is included in the modification of the desired partial surface region.

In the method of the present invention, a partial surface, i.e., at least a part of the surface of an element, to be modified is treated. In other words, the surface of an element selected as required is treated in part or in its entirety.

The element shape is not limited. The element may be sheet-shaped, yarn-shaped, fibrous, spherical, particulate, tubular or in any other shape, including a distorted one. The purpose of the element is also not limited. The surface modification method of the present invention is applied to an element in accordance with its specific purpose. The element is generally made of a material suitable for its intended purpose, e.g., plastic, resin, metal, glass, paper or leather, which utilizes the natural material, or a material similar thereto, e.g., synthetic leather. The surface modification method of the present invention is applicable, in principle, to any surface of an element made of various materials.

The "surface of an element" used herein includes the surface the element had originally and the element surface; treated by a certain method.

The "finely fractionalized polymer" used herein includes a polymer from the one fractionalized at its part to the monomer for the polymer. Viewed from the preferred embodiments, it includes any type of polymer cleaved in the presence of a cleaving catalyst, e.g., acid. The "polymer made into film" includes a substantial film and film oriented differently region by region relative to the two-dimensional plane.

The principle of surface modification is described more concretely by showing a modification of a surface comprising a single material to facilitate the explanation of the principle.

It is preferable that the "polymer" used herein comprises two sections, the first section having a functional group and the second section having an interfacial energy, which is different from that of the functional group of the first section and almost equivalent to the surface energy of the element to which it is to be attached, and that it is different from the material, which constitutes the element's surface. The desirable polymer may be adequately selected from those having an interfacial energy almost equivalent to the surface energy of the element to which it is to be attached, depending on the components of the element. It is more preferable that the "polymer" for this invention can be cleaved and subsequently condensed. It may have a functional group in addition to the two sections described above. In such a case, it is preferable, when a hydrophilic treatment is applied, that the hydrophilic group, used as the functional group, has a longer chain than any other functional group in the above first or second section, which is more hydrophobic than the above hydrophilic group.

The portion to be surface-treated by the present invention may be composed of a single material or a composite material of two or more types of materials. It also may be composed of a polymer different from the constituent of the element.

Principle of Surface Modification

Surface modification of an element by the present invention is effected by utilizing a polymer serving as the surface modifier, which comprises the main skeleton (generic term for one or more groups in the main or side chain) to which a group is bound. The main skeleton has an interfacial energy that is almost equivalent to the surface (interfacial) energy of the element's surface (substrate surface). The group has an interfacial energy different from the surface (interfacial) energy of the element's surface. The main skeleton helps the polymer to attach to the element's surface, while the group helps to form the polymer film (coating layer) oriented outward from the element's surface.

The polymer serving as the surface modifier for the present invention, when viewed from a different angle, has two types of groups. The first group has an affinity essentially different from that of the group exposed to the element surface before modification. The second group has an affinity essentially similar to that of the exposed group and is contained in the repeating unit in the main skeleton.

Figure 1B:
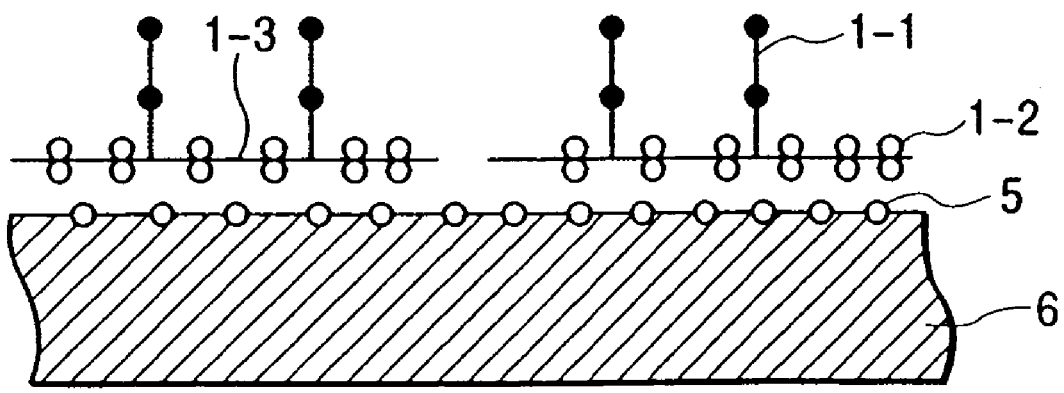

FIGS. 1A and 1B schematically illustrate the representative orientation types. FIG. 1A shows a polymer with a first group 1-1 and a second group 1-2 bonded as the side chains to the main chain 1-3 of the surface modifier, while FIG. 1B shows a polymer with the second group 1-2 constituting the main chain 1-3 itself and the first group 1-1 constituting the side chain.

Figure 24:
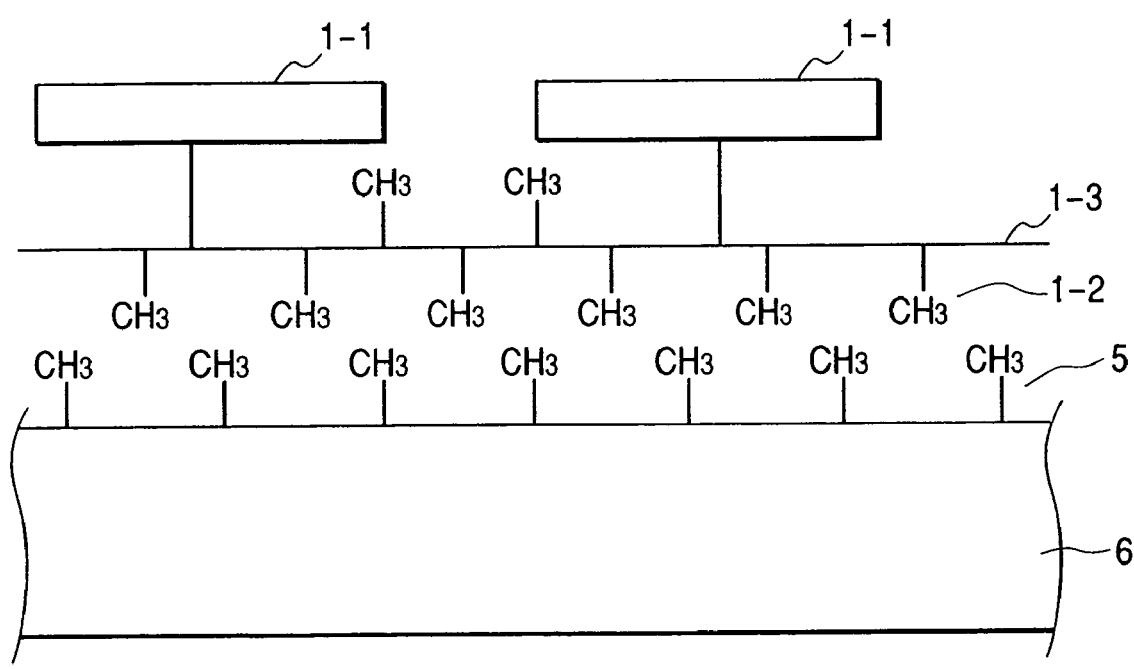
FIG. 24 is a schematic illustration of one example of a presupposed distribution of a hydrophilic group and a hydrophobic group in the surface subjected to the surface reforming treatment by the present invention.

In the orientation shown in FIGS. 1A and 1B, the outermost (outside) surface of the substrate 6, which constitutes the surface of the element to be surface-modified, has the first group 1-1 with an interfacial energy different from surface (interfacial) energy of the substrate 6 oriented on the surface. As a result, the properties associated with the first group 1-1 are utilized to modify the element surface. It should be noted that the surface (interfacial) energy of the substrate 6 is determined by the material/molecule that constitutes the surface and group 5 exposed to the surface. More concretely, in the example shown in FIGS. 1A and 1B, the first group 1-1 works as the functional group for surface modification to make the surface of the substrate 6 hydrophilic, when the substrate surface is hydrophobic and first group 1-1 is hydrophilic. When the first group 1-1 is hydrophilic and group 5 exposed to the surface on the side of substrate 6 is hydrophobic, e.g., when a polysiloxane is used as described below, it is considered that the conditions shown in FIG. 24 are present on the substrate surface. Under these conditions, it is possible to adjust, when water or an aqueous solution mainly comprising water is passed over the modified surface of the substrate 6, the flow conditions or a rate at which the water or the aqueous solution is passed by adjusting the balance between the hydrophilic and hydrophobic groups on the surface of substrate 6. Such a surface structure allows to alternately arrange the functional group supplied from the polymer P and the other group having properties different from those of the functional group on the substrate surface (element surface to be treated), to produce the above effect when the functional group is hydrophilic and the other group is hydrophobic.

These surface conditions may be produced suitably by the methods used in Examples described below, although not limited thereto. These conditions may be suitably applied to a variety of materials and elements, e.g., tubes and vessels for handling liquid, to produce the above effect by adjusting the balance between the hydrophilic and hydrophobic groups. In such a case, the functional group can have a longer chain than the other group.

In particular, when the element surface structure is fibrous or the like, as shown in FIG. 24, the hydrophilic group 1-1 is a polymer group and is longer than the methyl group (hydrophobic group) in the side chain on the same side. Therefore, when an aqueous solution is passed over the element, the hydrophilic group 1-1 slants toward the element surface (or inner plane) under the influence of the flow rate (and, at the same time, substantially covers the methyl group). As a result, a resistance to flow is greatly decreased. Conversely, when the aqueous solution is to be held over the element surface, the hydrophilic group 1-1 stands against the solution, i.e., oriented in the direction perpendicular to the element surface (or inner plane), as a result of which the methyl group is exposed to the fiber surfaces, making hydrophilic characteristics predominant over the hydrophobic characteristics at the intramolecular level. Therefore, a sufficient quantity of the solution can be held. The polymer preferably has many (at least two or more) hydrophilic groups to secure the function of the hydrophilic group 1-1. This is illustrated by an Example, which uses polyoxyalkylene-poly(dimethyl siloxane) having the hydrophilic group 1-1 with a number of -C—O—C- bonds and an -OH group as the terminal group. When the polymer has a methyl group replaced by another hydrophobic group, the hydrophilic group preferably has a higher molecular weight than the hydrophobic group, to occupy a larger space. In other words, it is preferable that a balance is produced in such a way that hydrophilic properties are predominant over hydrophobic properties.

The surface structure coming into contact with water in the present invention is applicable, as required, to the balanced hydrophilic and hydrophobic groups handling liquid other than water. For example, the element may be coated with a polymer P having a longer-chain hydrophilic group and a shorter-chain hydrophobic group arranged alternately for the surface coming into contact with a liquid to be held over the surface.

When the substrate 6 is made of polypropylene and polymer P is polyoxyalkylene-poly(dimethyl siloxane), the group 5 exposed to the surface of the substrate 6 is a methyl ($-CH_3$) group, and the substrate 6 has a surface energy of approximately 23 dyn/cm, due to the methyl group, which has a surface energy of approximately 23 dyn/cm. The poly(dimethyl siloxane) section of the polymer P of polyoxyalkylene-poly(dimethyl siloxane), having a methyl ($-CH_3$) group facing the outside, has a surface energy of approximately 23 dyn/cm. It is almost equivalent to that of the substrate 6, due to methyl group.

The polyoxyalkylene of polyoxyalkylene-poly(dimethyl siloxane) has a higher surface energy than the substrate 6, due to an -OH group as the terminal group (surface energy: 42 to 44 dyn/cm) and an oxyalkylene chain ($-CH_2-O-CH_2-$). Therefore, when the substrate 6 is of polypropylene and polymer P is polyoxyalkylene-poly(dimethyl siloxane) (shown in FIGS. 1A and 1B), the poly(dimethyl siloxane) section serves as the main chain 1-3, methyl group in the poly(dimethyl siloxane) section as the second group 1-2, and polyoxyalkylene section as the first group 1-1 (side chain).

One of the methods for producing the element having the modified surface shown in FIGS. 1A and 1B is specifically described. It uses an improver, which is a good solvent for the polymer as the surface modifier, and improves wettability of the treatment agent with the substrate. This method spreads the treatment solution (surface modifier solution) 8, in which the polymer is uniformly dissolved, over the substrate surface, and orients the polymer as described above, while removing the solvent from the treatment solution 8.

More specifically, a surface treatment solution is prepared by dissolving a given quantity of the polymer and cleavage catalyst in a solvent, which is a good solvent for the polymer and sufficiently wettable with the substrate surface. It preferably contains pure water, when the functional group serves as the hydrophilic group. The substrate is coated with the above solution on the surface and is treated by evaporation/drying (e.g., in an oven at 60EC) to remove the solvent in the surface treatment solution.

It is preferable for the present invention to use an organic solvent that is sufficiently wettable on the surface of the substrate 6 and dissolves the polymer P as the surface modifier in order to facilitate uniform coating of the surface with the polymer for the surface modification. One of the other effects of the organic solvent is to keep the polymer P uniformly dispersed in the liquid layer spread over the surface and sufficiently dissolved therein, even when it is concentrated via evaporation. In addition, the polymer P as the surface modifier is uniformly spread over the surface of the substrate 6, because of sufficient wettability to the treatment solution. As a result, the surface is uniformly coated with the polymer, even if the surface has a complex shape.

The surface treatment solution 8 may be prepared by two types of solvents. The first type is wettable to the surface of the substrate 6, volatile and a good solvent for the polymer P. The second type, although a good solvent, is less wettable to the surface of the substrate 6 and less volatile than the first type. One of the examples is a combination of isopropyl alcohol and water, described below, for the polyolefin-based resin serving as the surface of the substrate, which is coated with polyoxyalkylene-poly(dimethyl siloxane) as the polymer.

Addition of an acid 7 as the cleavage catalyst to the surface treatment solution is considered to bring about the following effects. For example, during the evaporation/drying step of the surface treatment solution, the acid component increases in concentration as the solution components evaporate. The acid whose concentration increased under heating accelerates the partial decomposition (cleavage) of the polymer P as the surface modifier and production of the finely fractionalized polymer P, allowing them to be oriented in the finer portions on the surface of the substrate 6. Another effect is expected. Recombination of the cleaved sections of the polymer P during the final stage of the evaporation/drying step accelerates the formation of the film (coating) of the polymer produced as a result of the recombination, preferably a monomolecular film.

Still another effect is expected. It is obtaining a cleaned surface of the substrate 6. The acid component of increased concentration, as a result of evaporation of the solvent during the evaporation/drying of the surface treatment solution 8, more efficiently removes impurities from the substrate surface and the vicinity thereof, thereby cleaning the surface. The cleaned surface is expected to promote physical adhesion between the substrate material/molecules and polymer as the surface modifier.

The acid whose concentration increased under heating partly decomposes the substrate surface, producing active sites thereon, which may cause auxiliary reactions between these sites and the finely fractionalized (cleaved) polymer, described above. Depending on conditions, chemical adsorption of the auxiliary surface modifier on the substrate partly helps stabilize adhesion of the surface modifier to the substrate.

The main skeleton of the surface modifier (including the hydrophilic treatment solution 8), having the surface energy almost equivalent to that of the substrate 6, is cleaved, and the resultant finely fractionalized parts are condensed with each other to form a polymer film on the surface of the substrate 6. Formation of the polymer film is explained by referring to FIGS. 2 to 8 for the case where the functional group 1-1 is hydrophilic to impart hydrophilic characteristics to the hydrophobic substrate surface. The hydrophilic group is a group having a structure that can impart hydrophilic characteristics as the whole group. It includes a hydrophilic group itself, and even a group having a hydrophobic chain or hydrophobic group, so long as it is substituted with a hydrophilic group or the like to be serviceable as a group capable of imparting hydrophilic characteristics.

Figure 2:
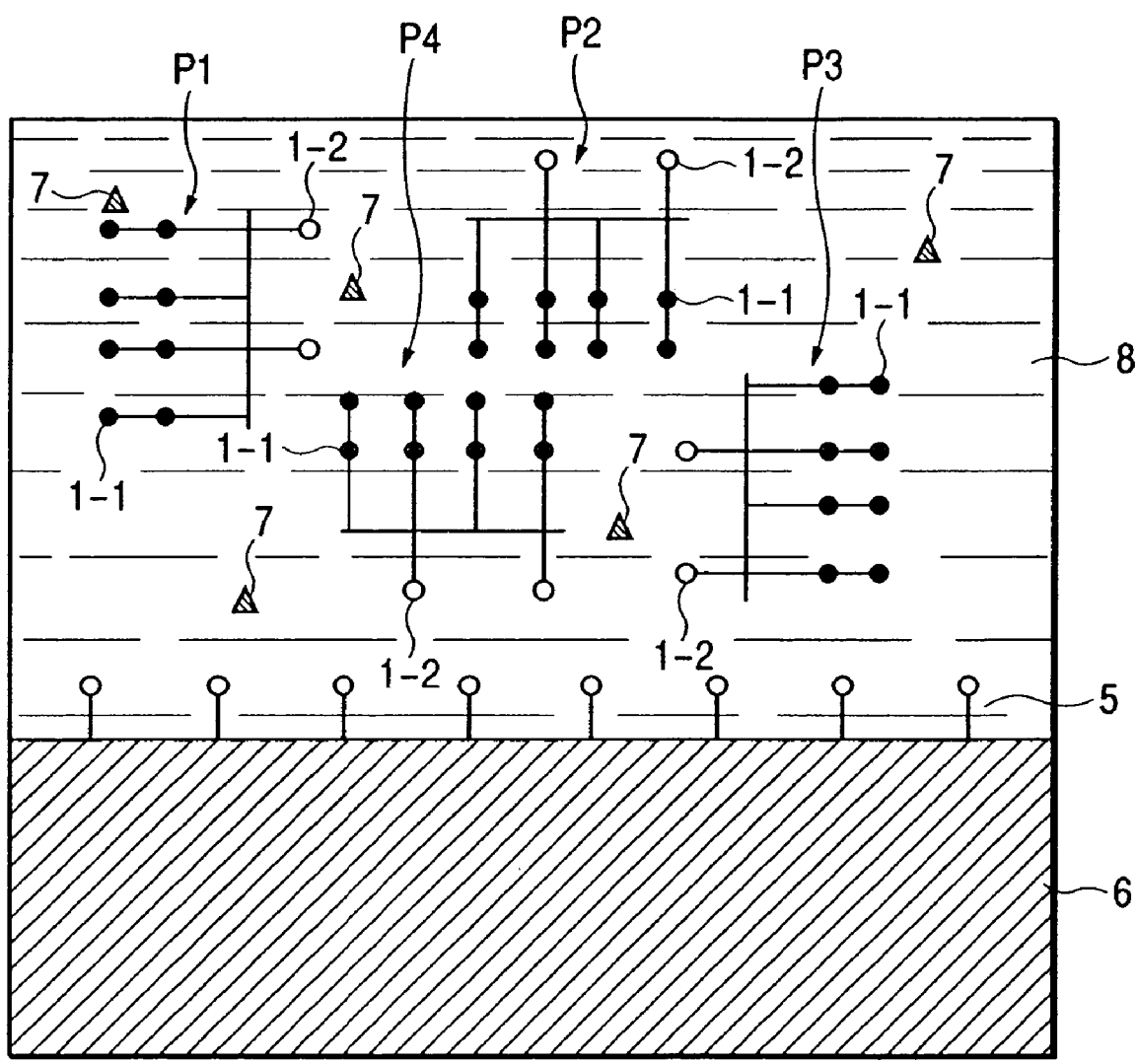
FIG. 2 is a schematic illustration of the state of applying a treatment solution containing a polymer as a surface reforming agent and forming a coating layer on the substrate in a surface reforming method of the present invention.
Figure 3:
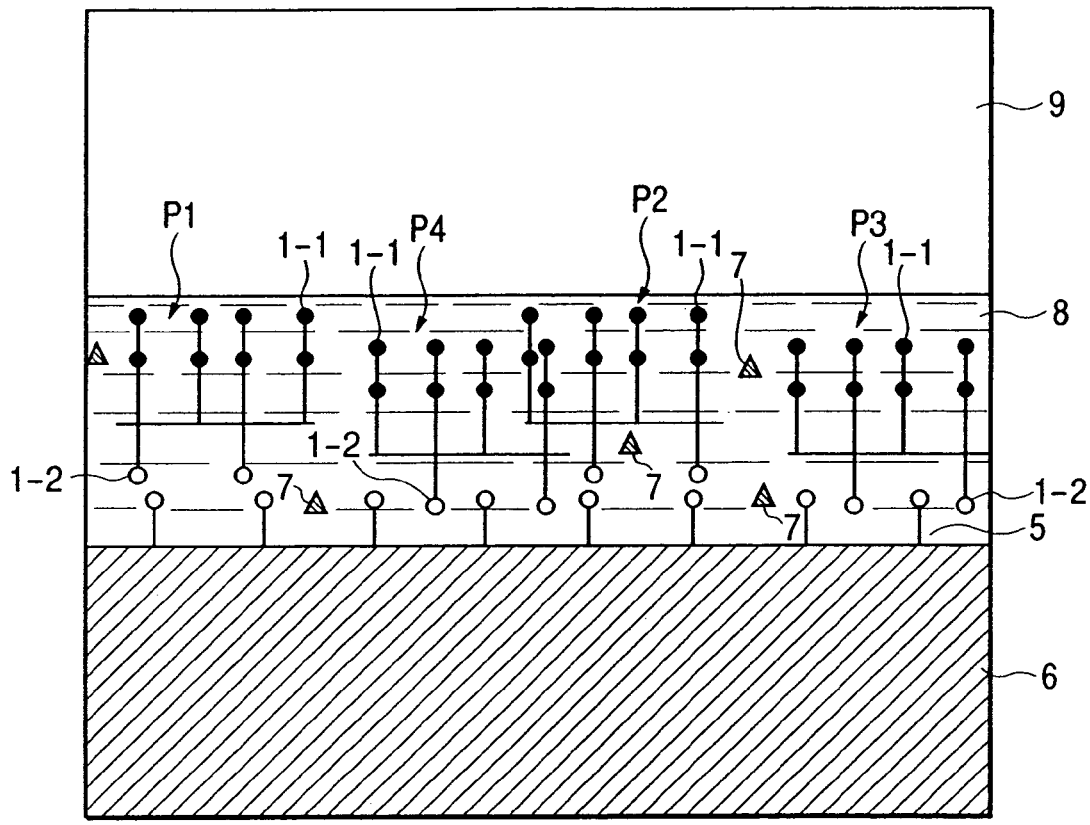
FIG. 3 is a generalized illustration of the step of partially removing a solvent in the coating layer formed on a substrate and containing a polymer as a surface reforming agent in a surface reforming method of the present invention.

FIG. 2 is an enlarged view illustrating the hydrophilic treatment solution 8 spread over the substrate surface. At this stage, polymers P1 to P4 as the hydrophilic agent and acid 7 are uniformly dissolved in the hydrophilic treatment solution 8 over the surface of the substrate 6. FIG. 3 is an enlarged view illustrating the drying step for the hydrophilic treatment solution spread over the substrate surface. During the drying step under heating, the acid component increases in concentration as a result of evaporation of the solvent to more efficiently remove impurities from the surface of the substrate 6 and the vicinity thereof. This cleaning effect exposes a pure substrate surface to promote physical adhesion between the substrate surface and polymers P1 to P4. At the same time, the increase in the acid concentration accelerates partial cleavage of the polymers P1 to P4.

Figure 4A:
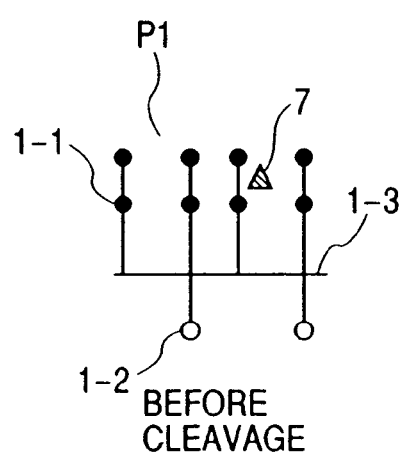
FIGS. 4A and 4B are generalized illustrations of the step of a partial dissociation of a polymer as a surface reforming agent caused by an acid added to a treatment solution following the step of partially removing a solvent in the coating layer containing the polymer.
Figure 4B:
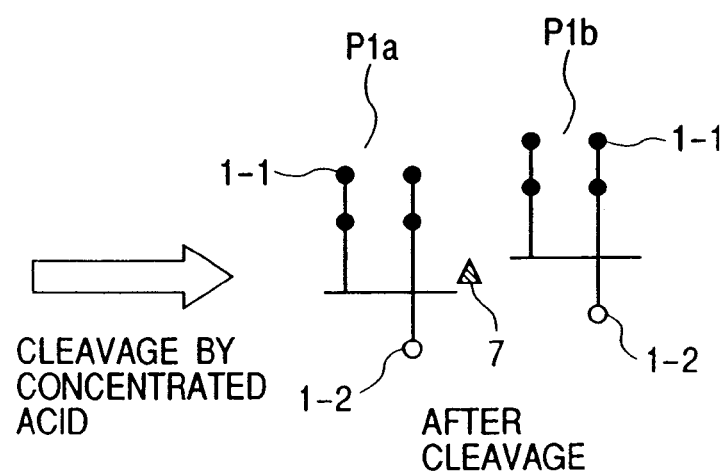
Figure 5:
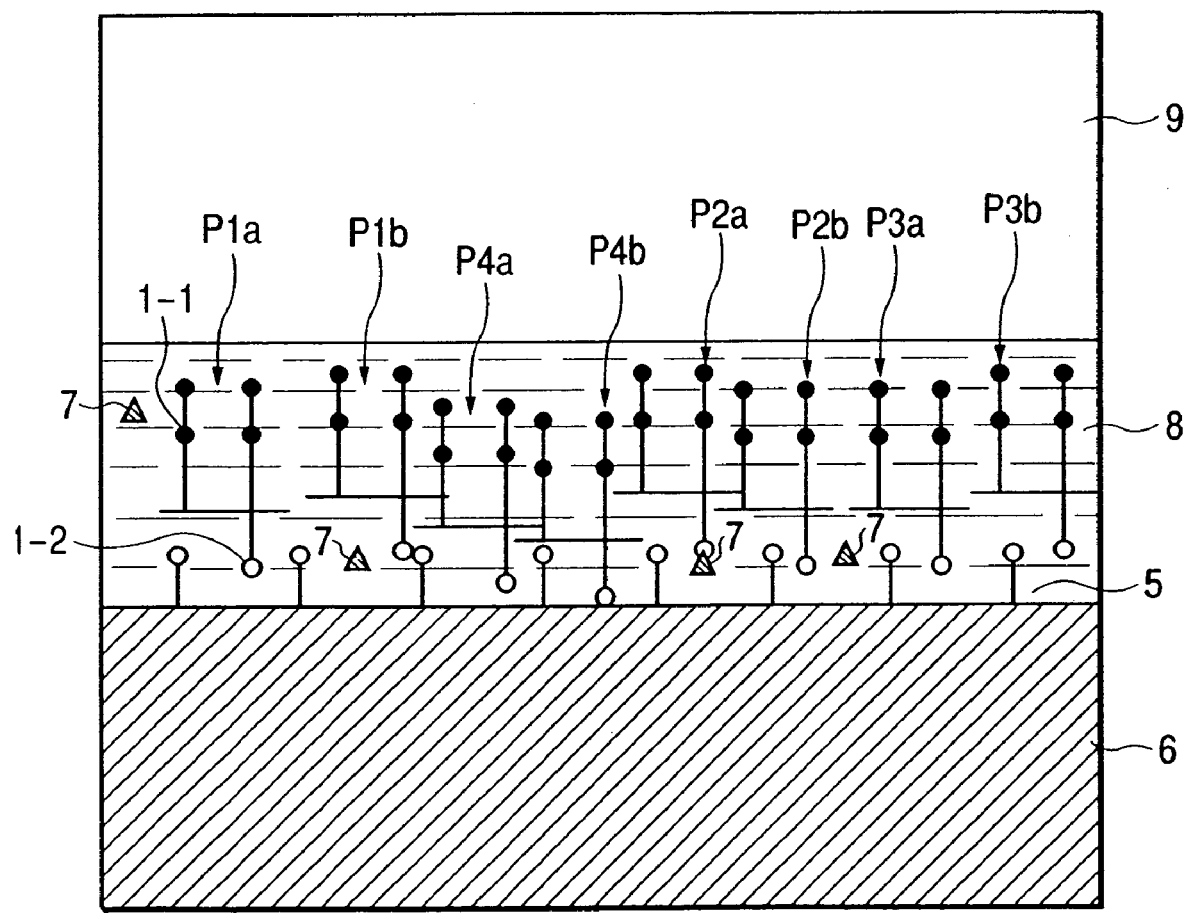
FIG. 5 is a generalized illustration of the step of orienting a polymer as a surface reforming agent or its dissociated and fractionalized products following the step of further removing a solvent in the coating layer containing the polymer.

FIGS. 4A and 4B schematically illustrate decomposition of the polymer P1 by the concentrated acid 7. As shown in FIG. 4A, the concentrated acid 7 acts on the polymer P1, to cleave the main skeleton 1-3 into the fractionalized products P1a and P1b, as shown in FIG. 4B. FIG. 5 illustrates adsorption of the fractionalized hydrophilic agent on the substrate 6. The main skeleton (having surface energy almost equivalent to that of the substrate 6) of the fractionalized products of P1a to P4b from the polymer P are selectively oriented on the pure surface of the substrate 6 exposed as a result of the cleaning, as the solvent evaporates and the fractionalized products reach a saturation concentration in the solution. As a result, the group 1-1 (having surface energy different from that of the substrate 6) in the surface modifier outside of the substrate 6 is oriented toward the substrate.

Figure 6:
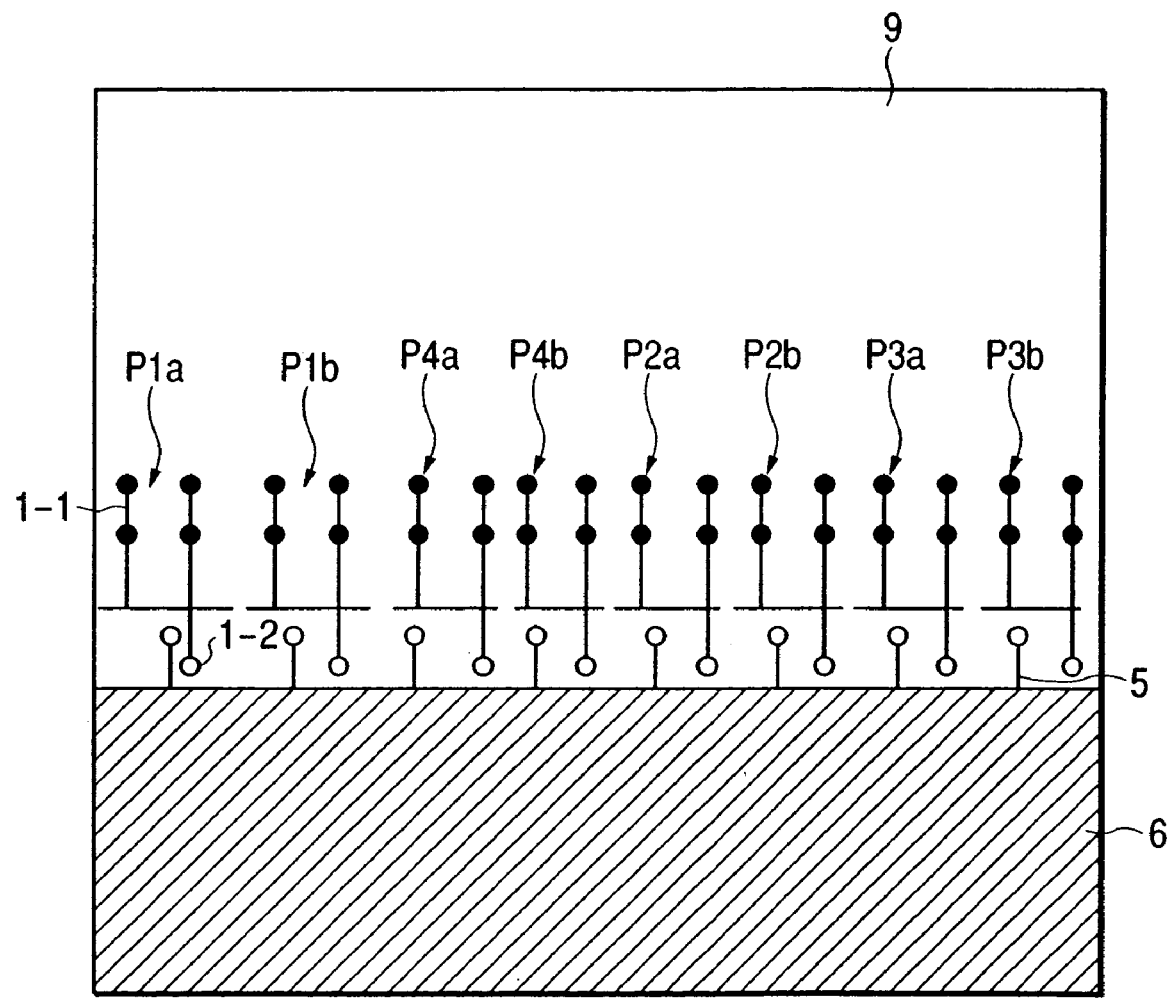
FIG. 6 is a generalized illustration of the step of orienting a polymer as a surface reforming agent or its dissociated and fractionalized products and attaching and fixing them on the surface following the step of drying and removing a solvent in the coating layer.

Thus, on the surface of the substrate 6 the main skeleton of the fractionalized polymers P1a to P4b having the surface energy almost equivalent to that of the substrate 6 are oriented. Group 1-1 having the surface energy different from that of the substrate 6 is oriented outward, i.e., in the opposite direction from the surface of the substrate 6. Therefore, when the group 1-1 is hydrophilic, the substrate surface becomes hydrophilic and is modified. FIG. 6 schematically illustrates the hydrophilic agent adsorbed on the substrate surface after the former is spread and dried.

Figure 7:
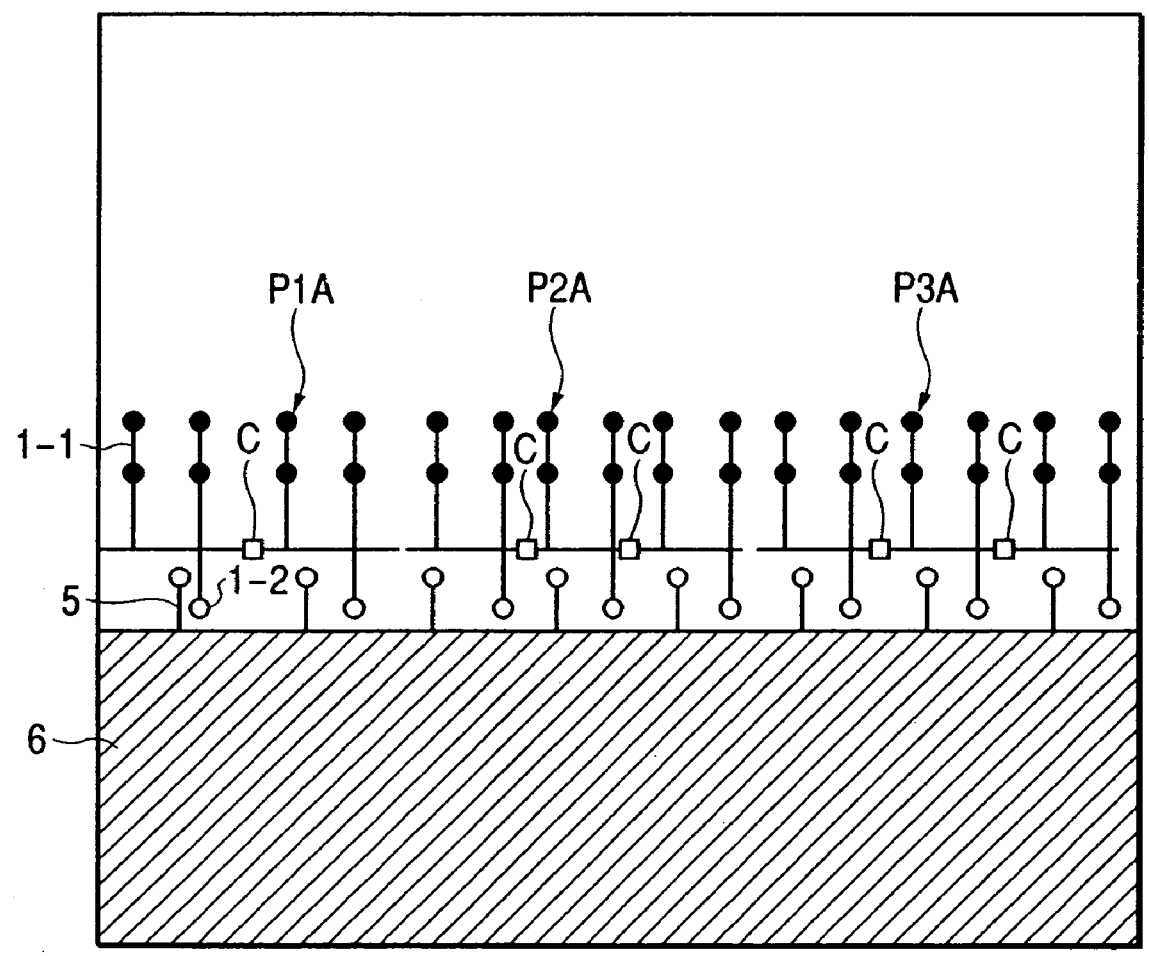
FIG. 7 is a generalized illustration of the step of re-bonding dissociated and fractionalized products with one another derived from a polymer as a surface reforming agent, which is attached and fixed to and on the surface, by a condensation reaction.

When a specific polymer, e.g., polysiloxane, is used, fractionalized products P1a to P4b are recombined with each other at least partly by condensation, to produce the polymer of higher molecular weight through the bonds (recombination sites C formed by condensation). This can increase the strength of the coating film of the hydrophilicization agent. When a polysiloxane is used, the siloxane section may be dissociated by the concentrated acid 7 after it is adsorbed by the substrate surface to be condensed with moisture 11 in air 9 through the recombination sites C, further stabilizing the adsorbed conditions. FIG. 7 schematically illustrates the recombination by condensation of the dissociated siloxane section with moisture 11 in air. The mechanisms involved in the cleavage to form the fractionalized products and their recombination to produce the condensed polymer P1A to P3A are explained below for the case of using a polysiloxane as the polymer.

The diluted acid increases in concentration in the surface treatment solution 8 as the solution spread over the surface to be treated is dried in a controlled manner. The concentrated acid 7 (e.g., $H_2SO_4$) cleaves the siloxane bond in polysiloxane into the fractionalized polysiloxane products and silylsulfuric acid (Scheme 1). These fractionalized products increase in concentration in the surface treatment solution 8 as the solution is further dried, increasing the probability of contact between them. As a result, the fractionalized products undergo condensation with each other, to reproduce siloxane bonds (Scheme 2). The methyl group in the silylsulfuric acid as the by-product is oriented toward the surface to be treated, when the surface is hydrophobic, and the sulfone group is oriented in the direction different from that of the surface, conceivably providing some contribution to hydrophilic treatment of the surface.

Scheme 1

General formula 1

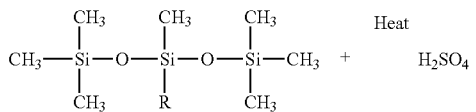

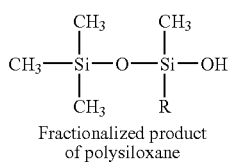 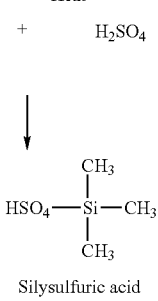

Fractionalized product of polysiloxane      Silysulfuric acid

Scheme 2

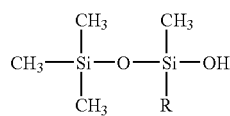 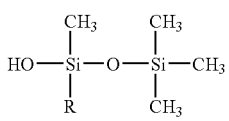 2 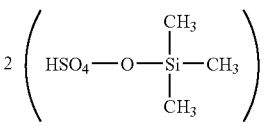

Fractionalized product of polysiloxane    Fractionalized product of polysiloxane    Silylsulfuric acid dehydration

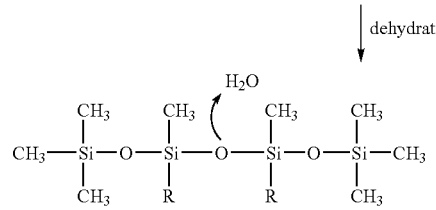 2 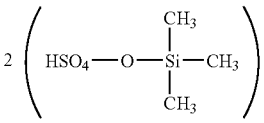

Figure 8:
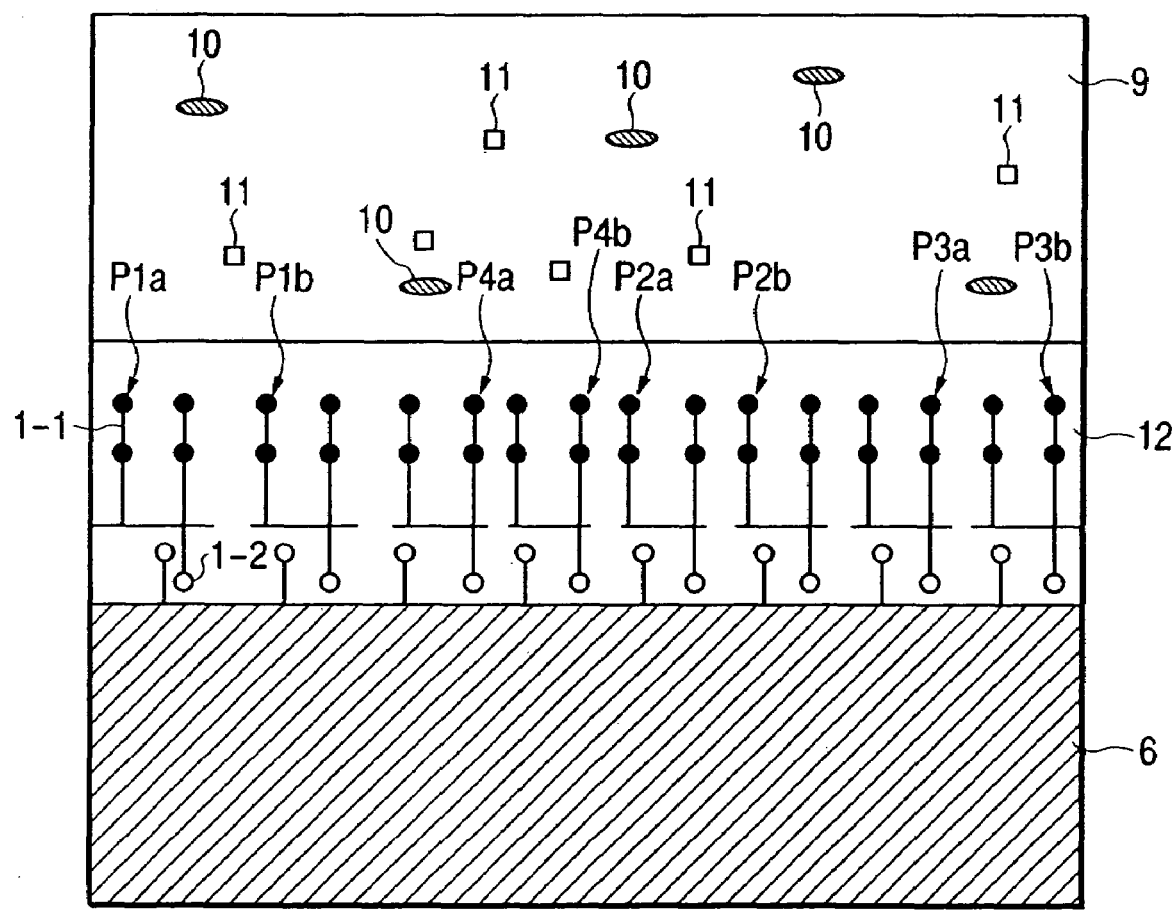
FIG. 8 is a generalized illustration of an embodiment of a surface reforming method of the present invention applied to change a hydrophobic surface to a hydrophilic surface, which illustration shows the effect of adding water to a treatment solution.

FIG. 8 schematically illustrates one example of the conditions of the surface treatment solution when there is water (water-containing layer 12) in the solvent. When water is present in the solvent for the treatment solution, which imparts hydrophilic characteristics onto the surface under heating, evaporation of the solvent is accompanied by evaporation of water and the volatile organic solvent (10: vapor of volatile organic solvent, and 11: vapor of water). During this step, since the volatile organic solvent is evaporated faster than water, water is concentrated in the solution, to increase surface tension of the solution. This produces a differential surface energy in the interface between the surface of the substrate 6 and the treatment solution. The section having the surface energy almost equivalent to that of the substrate 6 in the fractionalized products P1a to P4b is oriented toward the substrate surface in the interface between the substrate surface and treatment solution whose water content increases as a result of evaporation (water-containing layer 12). At the same time, the section having the hydrophilic group 1-1 in the fractionalized products P1a to P4b is oriented toward the water-containing layer 12 whose water content increases as a result of evaporation of the organic solvent. As a result, it is considered that the given orientation of the fractionalized products of the polymer is further improved.

The present invention is applicable to various elements and purposes, depending on the characteristics and types of the functional groups in the polymers used for surface modification.

(1) When the functional group is hydrophilic

The elements whose surface is modified by the method of the present invention include water-absorptive elements, e.g., paper diapers, sanitary napkins, ink absorbers for ink jet systems, and used ink absorbers (prepared by the method illustrated by one of the preferred embodiment described above, when the element contains olefin-based fibers), which can be surface-modified by the present invention to be sufficiently hydrophilic to instantaneously absorb liquid. The present invention is also useful for the elements required to hold liquid. The present invention is also applicable to pigment particles used as an ink colorant. When the particles are surface-modified by the method of the present invention, they may be well dispersed in water without using a dispersant. The fishing tools, e.g., fishing nets and lines, can reach a target point more quickly after being submerged in water when surface-modified by the method of the present invention, because they are more compatible with water.

(2) When the functional group has affinity for oil

The present invention can impart the required functions to those elements required to have affinity for oil at the portion in contact with oil, e.g., oil cans and transportation tanks.

(3) When the functional group is liquid-Repellent (e.g., hydrophobic group)

The present invention can expand functions of liquid-repellent liquid (whether it is water or oil) for various elements, e.g., a washing stand and kitchen sinks, walls, roads, mirrors, automobile exteriors or the like, and glass surfaces, at the molecular level, or even decrease these functions to desired levels, by controlling types of the functional groups or their numbers at a unit molecule.

(4) When the functional group is polar

The present invention can provide the elements with a filter function (by utilizing anodic properties for ion-exchanging or removal of impurities), or an adduct function by chemically reacting the element with a certain reactive group. In particular, when the filter composed of a number of fibers is formed by an olefinic polymer, the present invention can provide the filter with desired characteristics while making it treatable by incineration, and hence, environmentally favorable, as illustrated by one of the preferred embodiments described above.

The present invention also provides the element, which can develop a color or emit light, when a colorant or fluorescent agent reactive with the polar group and adsorptive is used.

The present invention greatly expands the range of these desired characteristics, and can find limitless applicable areas.

(5) When the functional group has no characteristics the element is required to exhibit, but is used to form a uniformly thin film In this case, the functional group is required to have interfacial energy different from that of the group on the side adsorbed on the polymer surface as the sole essential condition. It can improve orientation of the group to the sections having almost equivalent interfacial energy and surface energy. It is preferable, in this case, that the polymer is cleaved at least partly to cope with more diversified surface conditions. It is more preferable that the fractionalized structure resulting from the cleavage (monomer, dimer, trimer or polymer having an intermediate molecular weight) is recombined by condensation or cross-linking to form a polymer of a higher molecular weight to improve the adhesiveness.

The element provided with these characteristics by the present invention for its entire periphery or surfaces has the surface structure forming a strong film, thus becoming more durable.

(6) The present invention is applicable to any other area, so long as the element's characteristics improved by one or more of the mechanisms described above. All of these elements are included in the present invention.

The present invention provides especially excellent effects when it uses a treatment solution containing a wettability improver capable of improving wettability to the element surface and that the solvent of the polymer (e.g., isopropyl alcohol, IPA) can accelerate the cleavage of the polymer, one of the functional groups described above, and the polymer having interfacial energy different from that of the functional group and almost equivalent to partial surface energy of the element surface. The surface modification, effected by the cleavage and subsequent condensation exhibits particularly excellent effects, providing uniformity and characteristics that cannot be provided by the conventional method.

Figure 23:
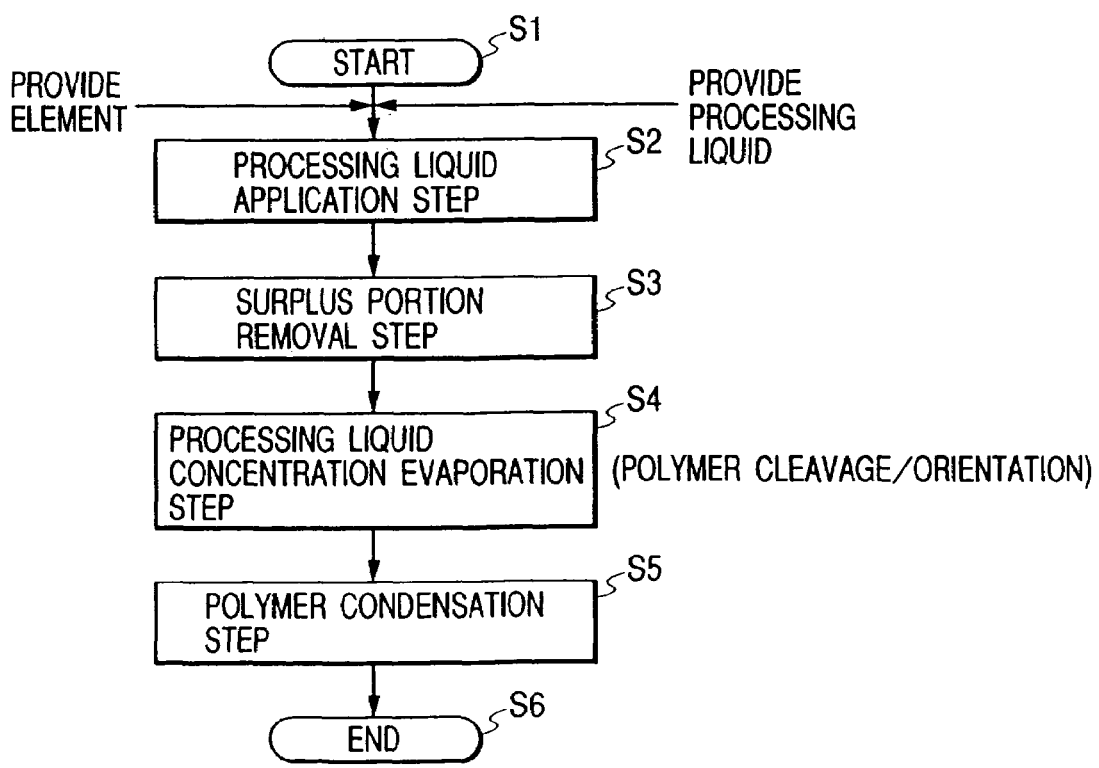
FIG. 23 is a flow chart illustrating one example of a manufacturing step of an element having a surface reformed by the present invention.

FIG. 23 illustrates one of the process examples for producing these elements. This process comprises a series of steps: supply of the element to be treated and treatment solution (processing liquid) as the first step (S1), application of the treatment solution to the element surface to be treated (S2), removal of surplus materials from the surface to be treated (S3), concentration/evaporation of the treatment solution for cleavage of the polymer and orientation of the fractionalized products on the surface to be treated (S4), condensation for recombining the fractionalized products to produce the polymer (S5), and production of the element with modified surfaces (S6).

The treatment solution concentration/evaporation step (S4) is preferably effected by a continuous heating/drying step at higher than the room temperature but at or lower than the boiling point of the solvent (e.g., 60EC) for a varying time, e.g., approximately 45 minutes to 2 hours when polysiloxane having a hydrophilic group is used together with water and an acid and organic solvent (e.g., isopropyl alcohol) for modifying the surface composed of a polyolefin-based resin, and around 2 hours when a 40 wt. % aqueous solution of isopropyl alcohol is used. The drying treatment time may be reduced by decreasing the water content.

In the example shown in FIG. 23, the fractionalized products are formed by cleavage of the polymer on the surface of the element to be treated. However, the treatment solution containing the fractionalized products beforehand may be spread over the surface of the element to be oriented thereon.

As described above, the treatment solution composition useful for the present invention comprises, e.g., a wettability improver, which is wettable to the surface to be modified for making the treatment solution more wettable to the surface to be treated and, at the same time, working as a good solvent for the surface modifier; solvent; polymer-cleaving catalyst; and polymer that contains a functional group for imparting the modification effects onto the surface and another group for imparting an adhesive function to the surface.

EXAMPLES

The surface modification method of the present invention, element surface modified by the method, and evaluation thereof are described more specifically by the Examples. It is to be understood that Examples are to provide some of the preferred embodiments and not to limit the present invention.

Example 1

Figure 9A:
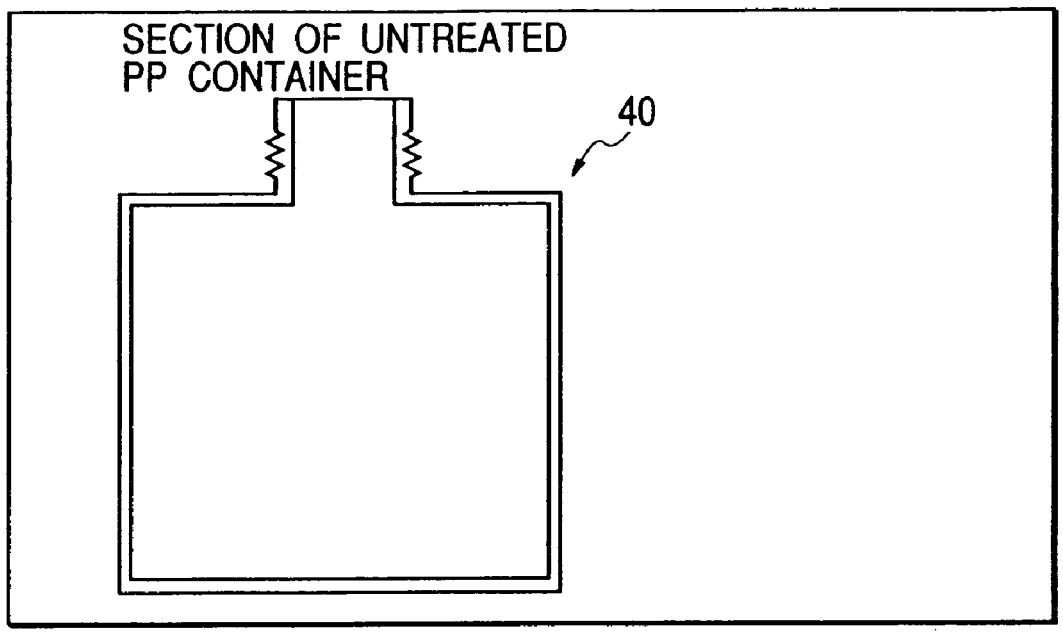
FIGS. 9A and 9B are schematic illustrations of an embodiment of a surface reforming method of the present invention applied to make a hydrophobic PP container inner wall face hydrophilic.

This example applied the present invention to modification of the internal hydrophobic wall surfaces of a polypropylene container 90 to make them hydrophilic, as illustrated in FIG. 9A.

The hydrophilic treatment solution having a composition given in Table 1 was prepared.

TABLE 1

(Hydrophilic treatment solution composition)

| Components | Contents (wt. %) |
|---|---|
| Polyoxyalkylene-poly(dimethyl siloxane) | 4.0 |
| Sulfuric acid | 0.5 |
| Isopropyl alcohol | 95.5 |

The solution was prepared using isopropyl alcohol as an organic solvent alcohol, which is a good solvent for dissolving polyoxyalkylene-poly(dimethyl siloxane). Isopropyl alcohol was first well mixed with sulfuric acid, which is used as an inorganic acid, added to 0.5 wt. % to increase the concentration in the final solution. Then, polyoxyalkylene-poly(dimethyl siloxane) was added to the above mixture to 4.0 wt. %, as polymer concentration in the final solution, and uniformly dissolved therein, to prepare the hydrophilic treatment solution. Polyoxyalkylene-poly(dimethyl siloxane) used for Example 1 is shown by the general formula (1):

General formula 2

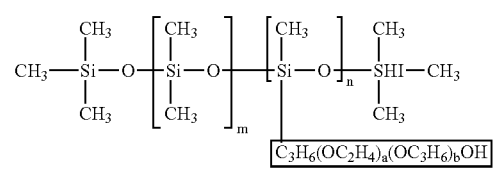

where, (m) and (n) are each a positive integer; (a) and (b) are also each a positive integer; and R is an alkyl or hydrogen. The polymer has a structure of poly(dimethyl siloxane) with one of the methyl groups in the main repeating unit being substituted by a polyoxyalkylene group. The commercial product (Nippon Unicar, silwet L-7002™) was used. The section enclosed by a rectangle in the general formula (1) is a hydrophilic group, which corresponds to the first group (functional group) in FIGS. 1A and 1B and group 1-1 in FIG. 24.

The above treatment solution dissolves a small quantity of water molecules, associated with concentrated sulfuric acid, in addition to the sulfuric acid molecules.

Figure 9B:
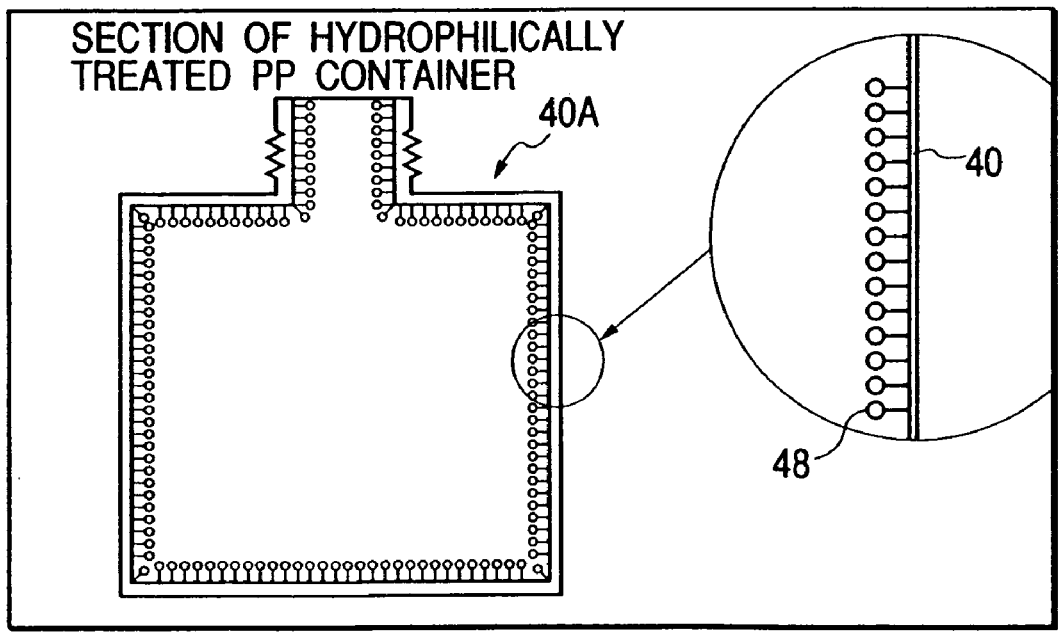

The treatment was attempted to make the inner wall surfaces of a polypropylene (PP) container 40 shown in FIG. 9A hydrophilic with the above hydrophilic treatment solution. A small quantity of the hydrophilic treatment solution prepared was put in the PP container of 50 ml in inner volume, to wet the container inner surfaces. The container was turned upside down and shaken after the inner surfaces were uniformly wetted, to release the surplus solution. The container whose inner surfaces were wetted with the coating film 48 of the hydrophilic treatment solution was dried in an oven at 60° C. for 1 hour. This produced the hydrophilically treated PP container 40A, shown in FIG. 9B.

Comparative Examples 1 to 3

Three types of solutions having the following compositions were prepared. The treatment was attempted for the inner wall surfaces of a polypropylene (PP) container with each of these solutions to verify the hydrophilic treatment effects imparted by the present invention.

(1) Solution Composition for Comparative Example 1

Comparative Example 1 used the hydrophilic-treatment solution composition shown in Table 1, except that it comprised only isopropyl alcohol and sulfuric acid. In other words, the solution for Comparative Example 1 was free of polyoxyalkylene-poly(dimethyl siloxane), which was used to form the desired polymer coating film by the present invention.

(2) Solution Composition for Comparative Example 2

Comparative Example 2 used the hydrophilic-treatment solution composition shown in Table 1, except that it comprised only isopropyl alcohol and polyoxyalkylene-poly(dimethyl siloxane). In other words, the solution for Comparative Example 2 was free of concentrated sulfuric acid and a small quantity of the water molecules associated therewith.

(3) Solution Composition for Comparative Example 3

Comparative Example 3 used the hydrophilic-treatment solution composition shown in Table 1, except that isopropyl alcohol was replaced by hexane, which is a bad solvent for polyoxyalkylene-poly(dimethyl siloxane).

A small quantity of each of the above solutions was put in the PP container of 50 ml in inner volume, to wet the container inner surfaces in a manner similar to that in Example 1. Each container was turned upside down and shaken, after the inner surfaces were uniformly wetted, to release the surplus solution. The container whose inner surfaces were wetted was dried in an oven at 60EC for 1 hour. The untreated PP container was also used in the Reference Example.

Each PP container was evaluated to determine whether or not a satisfactory treated surface was obtained. The evaluation methods and results are described below.

a) Method for Evaluating Hydrophilic Properties of the PP Container

The inner surfaces of a total of 4 PP containers, treated with the solution of Example 1 or Comparative Examples 1, 2 or 3, and the untreated container (Reference Example) were rinsed with pure water. Each container was filled with fresh pure water to approximately one-third of the, inner volume, after rinse water was discarded, and lightly shaken, to visually confirm conditions of pure water attaching to the inner wall surfaces of the containers.

b) Evaluation Results of Hydrophilic Characteristics of the PP Container

The inner surface of the PP container hydrophilically treated in Example 1 was wetted with pure water, compared to the untreated PP container for Reference Example, which was used as a reference. By contrast, those of the PP containers treated with the solution prepared in Comparative Example 1, 2 or 3 were not wetted at all, because pure water was observed to trickle down in droplets. Each of these containers clearly had a hydrophobic inner surface, as was the case with the reference container.

The solutions for Comparative Examples 2 and 3 contained polyoxyalkylene-poly(dimethyl siloxane), which, however, was not effectively adsorbed by the PP surfaces. As a result, it was washed off when the treated containers were rinsed with pure water immediately before they were evaluated.

By contrast, the PP container treated in Example 1 was wetted with pure water after it was rinsed, indicating that polyoxyalkylene-poly(dimethyl siloxane) was effectively adsorbed by the PP surface.

These evaluation results indicate that the surface of plastic material can be effectively hydrophilically treated with a solution containing a polyalkylsiloxane having a polyalkyleneoxide chain, acid and alcohol, which is spread over the PP container and dried. It was found that a polyalkylsiloxane polymer can be oriented on and attached to the PP surface as desired when the surface is treated with the polymer in the presence of an alcohol and an acid. It was confirmed that a combination of the acid and alcohol cleans the plastic surface, and that the cleaned surface coupled with the methyl group in the alkylsiloxane structure (as the repeating unit of the hydrophobic polyalkylsiloxane having a polyalkyleneoxide chain) oriented on the substrate surface improves overall adhesive power.

The polyalkylsiloxane having a polyalkyleneoxide chain can be uniformly dispersed on and effectively attached to the plastic surface, because it is dissolved in the alcohol, which is a good solvent for this polymer. When only a hydrophilic surfactant is spread over the plastic surface and dried thereon, the surface shows hydrophilic characteristics only during the initial stage, which, however, are lost when the surface is rinsed with pure water, because the surfactant is dissolved in and removed by water.

Example 2

Example 2 applied the surface modification method of the present invention to a fibrous element, more specifically to polypropylene/polyethylene (PP/PE) fibers, to conduct a hydrophilic surface treatment. The element of PP/PE fibers actually prepared was a block-shaped one in which the fibers were composited with each other to take a form useful for, e.g., an ink absorbing element, which could absorb liquid (e.g., ink) and hold the used liquid. For example, referring to FIG. 10A, a container 21 having an adequate shape and open to air by an opening 25 can be used as a liquid-holding container 20, when it is filled with fibrous bodies 23, capable of functioning as an absorbing element 24 to absorb and hold various types of liquid (e.g., ink), oriented in a given direction. Such an ink-absorbing element 24 can be suitably used for a discharged ink tank for ink jet recorders.

More specifically, the fibrous element 23, which constituted the absorbing element 24, was composed of the biaxial fibrous element of polypropylene and polyethylene fibers, each approximately 60 mm long. This biaxial fibrous element was of a core-sheath structure, with a polypropylene fiber having a higher melting point as the core 23b encased by polyethylene having a lower melting point as the sheath 23a. FIG. 11A shows its section perpendicular to the axial direction, whose external shape (outer peripheral shape) was essentially circular (closed ring shape). The fibrous blocks, each composed of the short fibers and having the above section, were arranged in the fiber axis direction in, and heated by, a cotton-carding machine, to fuse the fibers with each other. More specifically, they were heated at above melting point of polyethylene as the sheath 23a but below melting point of polypropylene as the core 23b, to obtain a structure with polyethylene sheaths 23a fused with each other at their points of contact.

In the above fibrous structure 23, referring to FIG. 10B, the fibers 23A were arranged in the fiber axis direction in the cotton-carding machine and continuously arranged mainly in the longitudinal direction (F1). They came into contact with, or close to, each other at points, e.g., α, β, γ and ε, shown in FIG. 10C. They were fused with each other under heating at the contact (intersection) points, e.g., at the points α, β, γ and ε, as shown in FIG. 10D, to form a network structure, giving the structure mechanical elasticity in the direction F2 perpendicular to the longitudinal direction F1. This was accompanied by increased the tensile strength in the longitudinal direction F1 shown in FIG. 10B. The structure, although lower in tensile strength in the direction F2 than in F1, was elastic with a restoring force against compressive stress in the direction F2.

Looking at the fibrous structure 23 in more detail, referring to FIG. 10D, the individual fibers 23A were crimped, to help form complex network structures between the adjacent fibers, and fused with each other, e.g., at the points α, β, γ and ε. Some of the crimped fibers 23A were arranged in the direction F2 perpendicular to the longitudinal direction F1, to make the structure three-dimensional with the fibers fused with each other. The fibrous element 23 actually prepared in Example 2 was formed into a concentric sliver of biaxial fiber tows, shown in FIG. 11A, with a polypropylene fiber (melting point: around 180° C.) as the core 23a encased in polyethylene (melting point: around 132° C.). The fibrous element 23, composed of the fibers mainly oriented in the longitudinal direction F1, shows fluid conditions within the element and stationary liquid-holding conditions clearly different in the directions F1 and F2, when immersed in a liquid.

In this example, the element shape was of a fibrous structure, generally holding more liquid than the container with planar surfaces, e.g., the container prepared by Example 1, and the treatment solution of the following composition was used:

TABLE 2

Hydrophilic treatment solution composition of fiber

| Components | Contents (wt. %) |
|---|---|
| Polyoxyalkylene-poly(dimethyl siloxane) | 0.4 |
| Sulfuric acid | 0.05 |
| Isopropyl alcohol | 99.55 |

(1) Method for a Hydrophilic Treatment of the Absorption Body of PP/PE Fibers

Figure 12A:
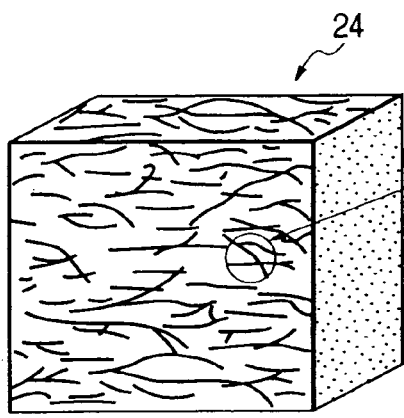
FIGS. 12A, 12B, 12C, 12D, 12E and 12F illustrate an application of a surface reforming method of the present invention to make a hydrophobic surface of the PE/PP fibrous body shown in FIGS. 10A to 10D hydrophilic.
Figure 12D:
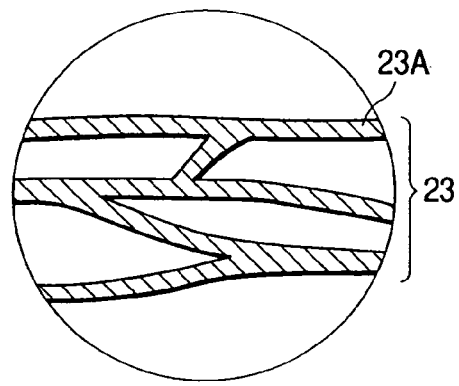
Figure 12B:
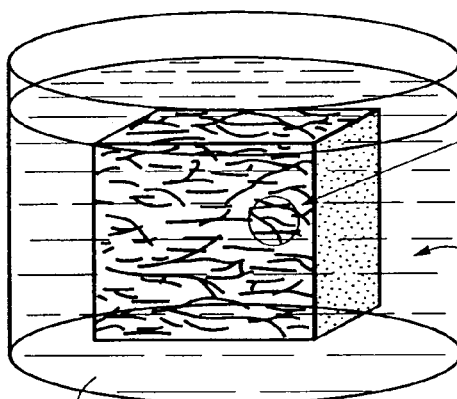
Figure 12E:
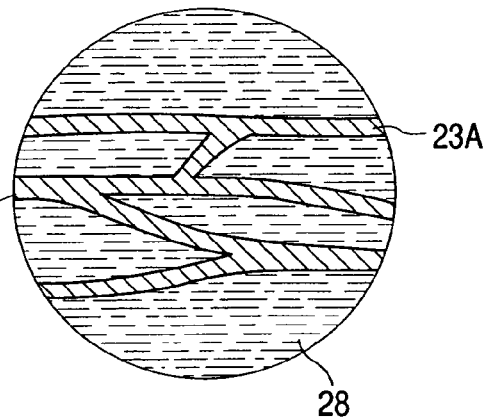
Figure 12C:
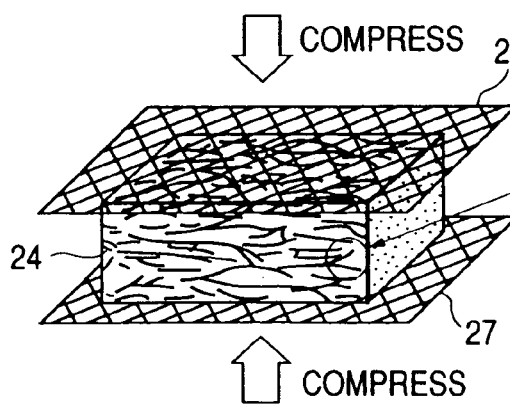
Figure 12F:
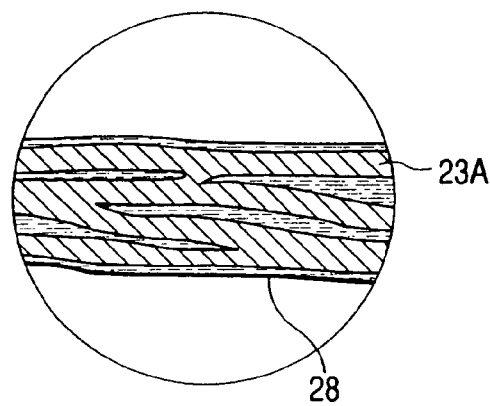

The absorption body 24 of polypropylene/polyethylene fibers, having the fusion-treated structure shown in FIG. 12A, was immersed in the hydrophobic treatment solution 28 of the above composition (FIG. 12B). The solution 28 was held in the voids between the fibers 23A for the fibrous absorption body 24, as shown in FIG. 12E as the magnified view of FIG. 12B. The fibrous absorption body 24 holding the solution 28 was pressed by a pressing jig 27, e.g., metallic mesh (FIG. 12C), to remove the surplus treatment solution 28 held in the voids between the fibers 23A, as shown in FIG. 12F as the magnified view of FIG. 12C. When the jig 27 was removed, the fibrous absorption body 24 returned back to the original shape, as shown in FIG. 13A, with the fibers 23A coated with the liquid layer 28A. The absorption body 24 with the fibers wetted with the solution was dried in an oven 29 at 60EC for 1 hour (FIG. 13B). This produced the fibrous absorption body 24 with the fibers 23A coated with the hydrophilic layer 28B, as shown in FIG. 13C. FIGS. 12D to 12F are partially magnified views of respective FIGS. 12A to 12C, and FIGS. 13D to 13F are partially magnified views of respective FIGS. 13A to 13C.

Comparative Example 4 and Reference Example 1

In Comparative Example 4, the fibrous absorption body was hydrophilically treated in the same manner as in Example 2 except that the treatment solution comprised only sulfuric acid and isopropyl alcohol. In other words, the solution for Comparative Example 4 was free of polyoxyalkylene-poly (dimethyl siloxane). The untreated fibrous absorption body of PP/PE fibers was also used in Reference Example 1.

In Example 2, 0.5 g of the fibrous absorption body of PP/PE fibers was treated by the above-described treatment method with 0.3 to 0.5 g of the above hydrophilic treatment solution. Comparative Example 4 used the same quantity of the solution applied to the whole element using the above-described application method.

Each fibrous absorption body thus prepared was evaluated to determine whether satisfactory surface conditions were achieved. The evaluation methods and results are described below.

(1) Method for Evaluating Hydrophilic Properties of the Fibrous Absorption Body of PP/PE Fibers a) Evaluation by Pure Water Drops Deposited by a Dropper Pure water drops were released from a dropper onto the fibrous absorption bodies of PP/PE fibers, prepared by Example 2 and Comparative Examples 4, and the untreated body (Reference Example), to observe the extent of pure water sinking into the bodies.

b) Evaluation by Immersion in Pure Water

The fibrous absorption bodies of PP/PE fibers, prepared by Example 2 and Comparative Examples 4, and the untreated body (Reference Example), were slowly placed on pure water, held by a container sufficiently large to accommodate the fibrous element, to observe the extent of pure water sinking into the bodies.

(2) Results of Evaluation of Hydrophilic Properties of the Fibrous Absorption Body of PP/PE Fibers (a) Results of Evaluation by Pure Water Drops Deposited by a Dropper Pure water drops, released from a dropper onto the fibrous absorption body of PP/PE fibers prepared by Example 2, were observed to instantaneously sink into the element.

By contrast, pure water drops released from a dropper onto the fibrous absorption body of PP/PE fibers prepared by Comparative Example 4 and the untreated body (Reference Example 1) were observed not to sink into the element. The drops were repelled to form droplets on the surfaces.

b) Results of Evaluation by Immersion in Pure Water

The fibrous absorption body prepared by Example 2 was slowly placed on pure water held by a container, and observed to slowly sink into water, indicating that its surfaces were hydrophilic.

By contrast, both the fibrous absorption body of PP/PE fibers prepared by Comparative Example 4 and the untreated body (Reference Example 1) slowly placed on pure water held by a container were observed to securely float on water. They showed no sign of absorbing water thereafter, indicating that they were clearly hydrophobic.

These results indicate that the fibrous absorption body of PP/PE fibers can be also coated with a polyalkyl siloxane layer (hydrophilic layer) 28B, as shown in FIG. 13C, to be effectively hydrophilically treated, when the solution containing a polyalkyl siloxane having a polyalkylene oxide chain, acid and alcohol was spread over the element surface and dried. Therefore, it was found that the fibrous absorption body 24 of PP/PE fibers can sufficiently function as an element for absorbing aqueous ink.

The fiber surfaces were analyzed by a scanning electron microscope (SEM) in order to verify that the surface modification method of the present invention attaches a polyalkyl siloxane having a polyalkylene oxide chain to the PP/PE fiber surface to form the polymer coating layer thereon.

Figure 14:
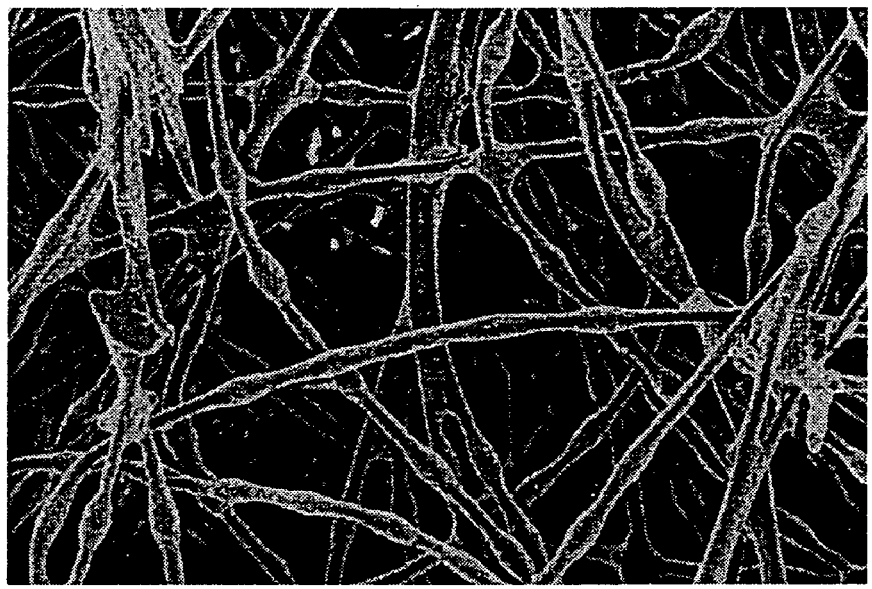
FIG. 14 is a SEM photograph (magnification 150) illustrating untreated PP-PE fibrous shapes and their surface state of a reference example (an untreated PP-PE fibrous absorbent)
Figure 15:
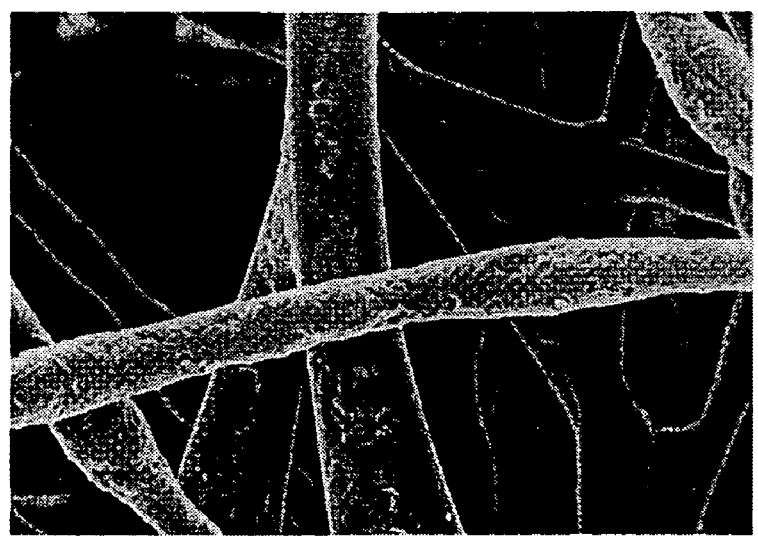
FIG. 15 is a SEM photograph (magnification 500) illustrating untreated PP-PE fibrous shapes and their surface state of a reference example (an untreated PP-PE fibrous absorbent)
Figure 16:
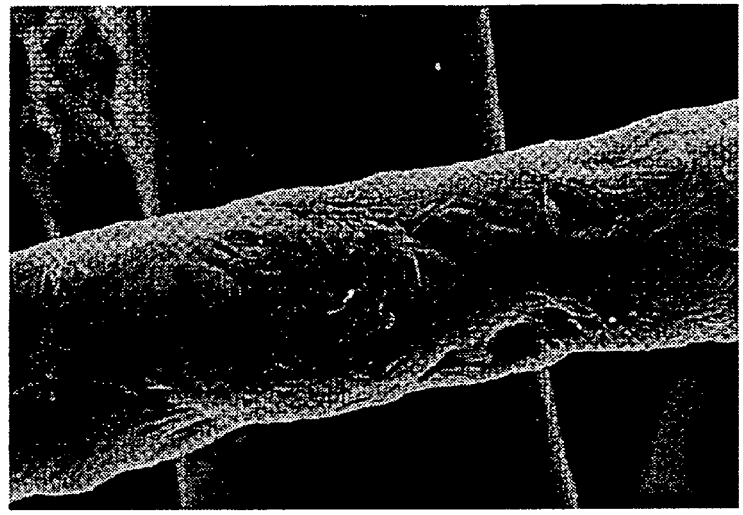
FIG. 16 is a SEM photograph (magnification 2,000) illustrating untreated PP-PE fibrous shapes and their surface state of a reference example (an untreated PP-PE fibrous absorbent)
Figure 17:
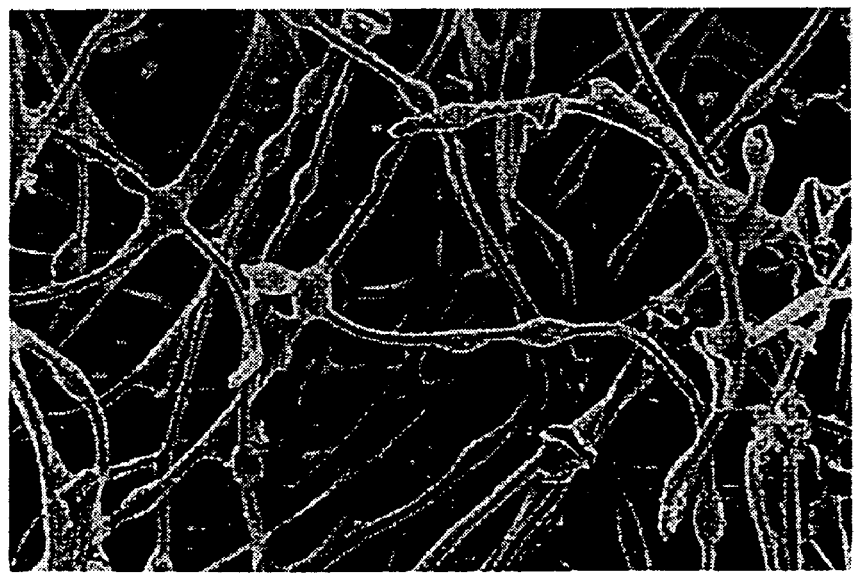
FIG. 17 is a SEM photograph (magnification 150) illustrating acid-treated PP-PE fibrous shapes and their surface state of a comparison example 4 (PP-PE fibrous absorbent treated only with an acid and an alcohol)

FIGS. 14, 15 and 16 show the magnified SEM photographs of the untreated PP/PE fiber surfaces of the fibrous absorption body of Reference Example 1 (magnification: 150, 500 and 2,000, respectively). FIG. 17 shows the magnified SEM photograph of the PP/PE fiber surfaces of the fibrous absorption body of Comparative Example 4, treated with only the acid and alcohol (magnification: 150).

Figure 18:
FIG. 18 is a SEM photograph (magnification 150) illustrating treated PP-PE fibrous shapes and their surface state of example 2 (a PP-PE fibrous absorbent treated to be hydrophilic)
Figure 19:
FIG. 19 is a SEM photograph (magnification 500) illustrating treated PP-PE fibrous shapes and their surface state of example 2 (a PP-PE fibrous absorbent treated to be hydrophilic)
Figure 20:
FIG. 20 is a SEM photograph (magnification 2,000) illustrating treated PP-PE fibrous shapes and their surface state of an example 2 (a PP-PE fibrous absorbent treated to be hydrophilic)

FIGS. 18, 19 and 20 show the magnified SEM photographs of the PP/PE fiber surfaces of the hydrophilically treated fibrous absorption body of Example 2 (magnification: 150, 500 and 2,000, respectively).

No structural changes were considered to result from depositing an organic substance on the fiber surfaces, as clearly shown in all of these magnified SEM photographs of the PP/PE fiber surfaces. Indeed, no difference is observed between the untreated PP/PE fiber surfaces (FIG. 16) and hydrophilically treated PP/PE fiber surfaces (FIG. 20) even if magnified by a factor of 2,000. It is therefore judged that the hydrophilically treated PP/PE fibers are uniformly coated with a thin film (considered to be monomolecular layer) of polyoxyalkylene-poly(dimethyl siloxane) and their appearance is not different from the untreated surfaces when evaluated via the SEM analysis.

By contrast, the PP/PE fiber surfaces treated only with the acid and alcohol show the fiber intersections (fused sections) cut at many points and also have many knot-like sections in the fibers, as shown in the SEM photograph (FIG. 17). These changes are considered to result from deterioration of the PE/PP molecules on the fiber surfaces (in particular PE molecules in the surface layer) during the heating/drying step, accelerated by the increased concentration of the acid as a result of evaporation of the solvent and heat used for the drying step.

On the other hand, the hydrophilic treatment of the present invention does not cause cutting at the fiber joints or formation of knot-like sections in the fibers, which are observed in the PP/PE fiber surfaces treated only with the acid and alcohol, even when the treatment solution contains the same concentration of the acid and the same heating/drying step is performed. This fact indicates a controlled deterioration of the PE molecules on the fiber surfaces during the hydrophilic treatment for Example 2. It is considered, even when the acid acts on the fiber surfaces to cut the PE molecules and produce radicals within the molecules, that some materials and structures capture the radicals to control the destruction of the PE molecules by chain reactions caused by the radicals. It cannot be ruled out that polyoxyalkylene-poly(dimethyl siloxane) attaching to the fiber surfaces is involved in the capture of the radicals to form the chemical bonds with the PE surfaces while capturing the radicals formed and thereby controls the destruction of the PE/PP molecules by the radical-caused chain reactions.

Overall, it is judged that modification of the fiber surfaces is achieved in Example 2 by the thin film of polyoxyalkylene-poly(dimethyl siloxane) uniformly deposited on the fiber surfaces. The favorable side effects during the hydrophilic treatment include cleaning of the fiber surfaces by the acid and solvent contained in the treatment solution, which possibly accelerates physical adsorption of the polyalkylene oxide chain. The chemical bonding between the PE molecules, cut by the acid of increased concentration and heat, and polyalkylene oxide chains can occur on a large scale.

The biaxial fiber may be eccentric, as shown in FIG. 11B, with the core section (core material) 23b partly exposed to the outer surface, as a result of which the fiber surfaces have the outer layer (sheath) 23a surfaces and core surfaces. The surface modification method of the present invention can impart hydrophilic properties to both the exposed core surfaces and sheath surfaces, even in such a case. When only a hydrophilic surfactant is spread over the surface and dried thereon, the surface partly shows hydrophilic properties only during the initial stage. These properties are, however, lost when the surface is rinsed with pure water with light rubbing, because the surfactant is dissolved in and removed by water.

Example 3

This example applied the present invention to a hydrophilic treatment of plastic particle surfaces. More specifically, the polypropylene particle surfaces were treated in a manner similar to that in Example 1, which modified the water-repellent inner wall surfaces of the polypropylene container to be hydrophilic.

The hydrophilic treatment solution having a composition shown in Table 3 was prepared.

TABLE 3

| Hydrophilic treatment solution composition | |
|---|---|
| Components | Contents (wt. %) |
| Polyoxyalkylene-poly(dimethyl siloxane) | 4.0 |
| Sulfuric acid | 0.5 |
| Isopropyl alcohol | 95.5 |

The solution was prepared by the method similar to that in Example 1. Isopropyl alcohol was first well mixed with sulfuric acid added to a concentration of 0.5 wt. % in the final solution. Then, polyoxyalkylene-poly(dimethyl siloxane) was added to the above mixture to a concentration of 4.0 wt. % in the final solution, and uniformly dissolved therein, to prepare the above hydrophilic treatment.

(1) Hydrophilic Treatment of Polypropylene (PP) Particles

The PP particles 31 used for Example 3 were spherical, having a diameter of 2 mm.

Figure 22:
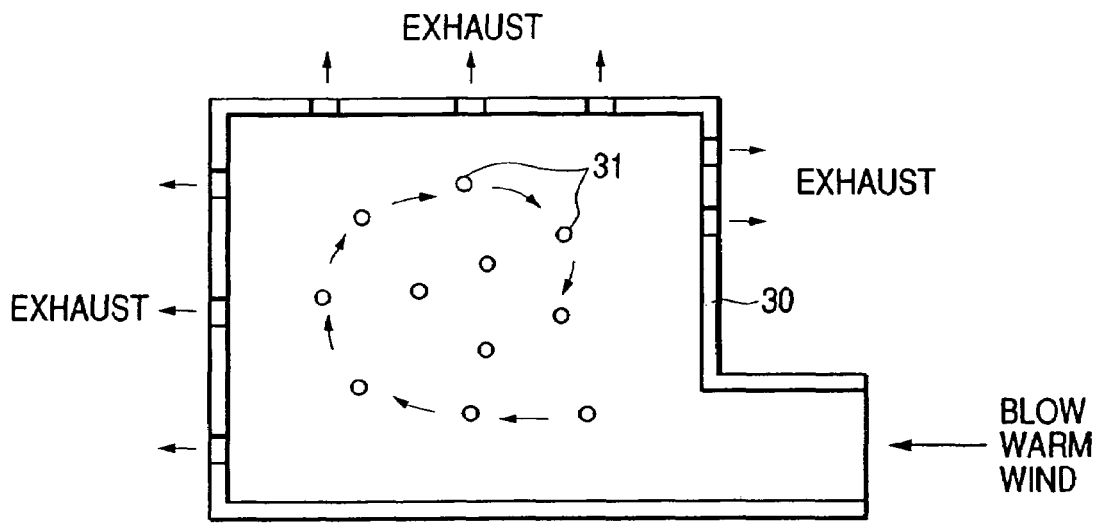
FIG. 22 is a schematic illustrating the step of stirring and drying a PP fine particle coated with a treatment solution by warm air blow.

The PP particles 31 were immersed in the above hydrophilic treatment solution 38 and then scooped up to be separated from the solution. The PP particles 31 coated with the treatment solution 38 were put in a container 30 (FIG. 22). Hot wind was vigorously sent into the container 30 and the particles 31 were stirred to prevent fusing. These particles were treated during this step by evaporating the solvent included in the treatment solution 38 and drying the particles. This treatment method is one of the preferred embodiments of the present invention, because of its favorable effects; e.g., uniform coating and film-making resulting from the rotation of the PP particles and surface tension around the spheres to secure a uniform coating.

Reference Example 2

The untreated PP particles were used for Reference Example 2.

The treated surface conditions were evaluated by the following methods for the PP particles treated for surface modification (Example 3) and untreated (Reference Example 2).

Method for Evaluating Hydrophilic Properties of the PP Particles (1) Evaluation by Stirring with Pure Water The PP particles, hydrophilically treated for surface modification (Example 3) and untreated (Reference Example 2) were put in pure water held in a polyethylene container and stirred therein by a stirrer to observe the particle conditions.

(2) Evaluation Results of Hydrophilic Properties of the PP Particles

The results of evaluation by stirring with pure water are described. When the PP particles treated in Example 3 were stirred in pure water, they were found to be dispersed and stirred in pure water. By contrast, the untreated PP particles (Reference Example 2) were scarcely dispersed in pure water and were found to be forced to move toward the polyethylene container walls and float on pure water.

Figure 21A:
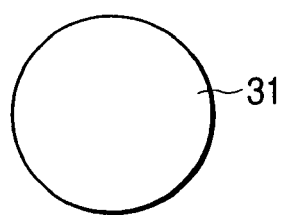
FIGS. 21A, 21B, 21C and 21D illustrate an example of application of the surface reforming method of the present invention to make the surface of a PP fine particle hydrophilic.
Figure 21B:
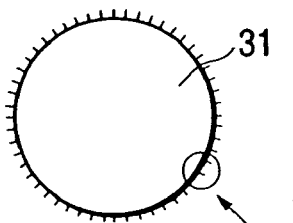
Figure 21C:
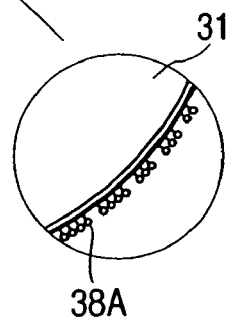
Figure 21D:
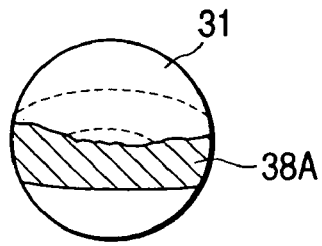

The results indicate that the PP particles prepared by Example 3 were well hydrophilically surface-treated, as was the case with the container prepared by Example 1. This means that the untreated PP particle surfaces (shown in FIG. 21A) were densely coated with the coating film 38A of polyoxyalkylene-poly(dimethyl siloxane), as shown in FIG. 21B. It was also confirmed that the method of the present invention is applicable not only to a flat plane (Example 1) but also to a curved surface, such as particle surface (Example 3), to easily form the polymer coating 38A as schematically shown in FIG. 21D. As shown, the ring-shaped polymer coating 38A on the surface periphery (closed ring-shaped section of the section periphery) keeps the surface-modified section from easily coming off. FIG. 21A is the section of the untreated PP particle, FIGS. 21B and 21C are the section of the hydrophilically treated PP particle and its partially magnified view, respectively, and FIG. 21D is the polymer film covering the outer periphery of the PP particle.

Example 4

Example 4 applied the method of the present invention to a fibrous element of propylene/polyethylene (PP/PE) fibers for surface modification with a solution containing poly(dimethyl siloxane) (amino-modified poly(dimethyl siloxane)) having amino group as the functional group.

More specifically, the fibrous element of PP/PE fibers was coated with amino-modified poly(dimethyl siloxane) by the procedure similar to that in Example 2, to modify the water-repellent polypropylene surface to be hydrophilic. The fibrous element of PP/PE fibers used in this example was the same as the one in Example 2.

This example used the same hydrophilic treatment solution as that in Example 2, except that polyoxyalkylene-poly(dimethyl siloxane) was replaced by amino-modified poly(dimethyl siloxane).

TABLE 4

| Surface modification solution composition | |
|---|---|
| Components | Contents (wt. %) |
| Amino-modified poly(dimethyl siloxane) | 0.4 |
| Sulfuric acid | 0.05 |
| Isopropyl alcohol | 95.55 |

The solution was prepared using isopropyl alcohol as an organic solvent alcohol well dissolving amino-modified poly(dimethyl siloxane) as the polymer. The amino-modified poly(dimethyl siloxane) used had a structure with one of the methyl groups in the repeating unit of poly(dimethyl siloxane) substituted by a functional group having an amino group. It was a commercial product (GE Toshiba Silicone, modified silicone oil TSF47003).

Isopropyl alcohol was first well mixed with amino-modified poly(dimethyl siloxane) added to a concentration of 0.4 wt. % in the final solution. Then, sulfuric acid as an inorganic acid was added to the above mixture to a concentration of 0.05 wt. % in the final solution, and uniformly dissolved therein, to prepare the surface modification solution.

(1) Method for Surface Treatment of the Fibrous Absorption Body of PP/PE Fibers

The absorption body of polypropylene/polyethylene fibers, having the structure shown in FIG. 12A, was immersed in the hydrophobic treatment solution 28 of the above composition (FIG. 12B). The solution was held in the voids between the fibrous absorption body. The fibrous absorption body holding the solution was pressed (FIG. 12C) to remove the surplus treatment solution held in the voids between the fibers. When the pressing jig, e.g., metallic mesh, was removed, the fibrous absorption body returned back to the original shape, as shown in FIG. 13A, with the fibers coated with the liquid layer. The absorption body with the fibers wetted with the solution was dried in an oven at 60EC for 1 hour (FIG. 13B).

Reference Example 3

The untreated fibrous absorption body of PP/PE fibers was used for Reference Example 3.

Each fibrous absorption body of PP/PE fibers thus prepared was evaluated to determine whether satisfactory surface conditions were achieved.

(1) Method for Evaluating Surface Modification of the Fibrous Absorption Body of PP/PE Fibers a) Evaluation by Immersion in an Aqueous Solution of an Anionic Dye The fibrous absorption bodies of PP/PE fibers, prepared by Example 4 and an untreated body (Reference Example 3)

were immersed in a 10% aqueous solution of C.I. Direct Blue 199 dye as the anionic dye and then washed with pure water with rubbing to observe the washed conditions.

b) Results of Evaluation of the Surface Modification of the Fibrous Absorption Body of PP/PE Fibers The following results were obtained by the evaluation tests by immersion in an aqueous solution of an anionic dye.

The fibrous absorption body of PP/PE fibers prepared by Example 4 remained lightly cyan in color derived from the dye when immersed in a 10% aqueous solution of C.I. Direct Blue 199 dye, serving as the anionic dye, and then washed with pure water with rubbing.

By contrast, the untreated fibrous absorption body of PP/PE fibers for Reference Example 3 returned back to the original color of white when immersed in a 10% aqueous solution of C.I. Direct Blue 199 dye and then washed with pure water with rubbing, indicating that the aqueous dye solution was washed off and that the body was not compatible with the solution.

As described above, the fibrous absorption body of PP/PE fibers prepared by Example 4, where it was surface-modified with poly(dimethyl siloxane) having an amino group as the functional group, remained lightly cyan in color when immersed in the aqueous dye solution and then washed with water, indicating that the amino-modified poly(dimethyl siloxane) attached to the surfaces of the fibrous absorption body of PP/PE fibers, because a solution containing the amino-modified poly(dimethyl siloxane), acid and alcohol was spread over the surface and dried. In other words, the fibrous absorption body of PP/PE fibers was coated with the amino-modified poly(dimethyl siloxane) and surface-modified into the cationic element by the amino group as a cationic group in the amino-modified poly(dimethyl siloxane). The fibrous absorption body of PP/PE fibers, becoming cationic by the surface modification, reacted with the anionic dye in the aqueous anionic dye solution and was colored. It was also found that the fibers were cyan-colored on the inside, which indicated that the surface modification method of the present invention effectively modified the inside of the fiber assembly of a complex structure.

In Example 4, amino-modified poly(dimethyl siloxane) having an amino group as a cationic functional group was used for modification of the water-repellent PP surface. However, it is considered that the PP surface can be surface-modified to be anionic when a functional group other than a cationic group, e.g., anionic functional group, is used as the functional substituent for the poly(dimethyl siloxane) section as the skeleton of amino-modified poly(dimethyl siloxane). An anionic functional group may be used together with an alkali substance as the cleavage catalyst. Thus, it is considered that PP can be surface-modified to have desired properties for specific purposes by changing the functional substituent for the poly(dimethyl siloxane) section as the skeleton to be utilized for the surface deposition depending on surface modification purposes.

Example 5

This example applied the present invention to a surface modification of plastic particle surfaces with a solution containing an amino-modified poly(dimethyl siloxane). More specifically, the polypropylene particle surfaces were coated, in a manner similar to that for Example 3, with the amino-modified poly(dimethyl siloxane).

The hydrophilic treatment solution having a composition shown in Table 5 was prepared.

TABLE 5

| Hydrophilic treatment solution composition | |
|---|---|
| Components | Contents (wt. %) |
| Amino-modified poly(dimethyl siloxane) | 0.4 |
| Sulfuric acid | 0.05 |
| Isopropyl alcohol | 95.55 |

The solution was prepared by the method similar to that in Example 4. Isopropyl alcohol was first well mixed with the amino-modified poly(dimethyl siloxane) added to a concentration of 0.4 wt. % in the final solution. Then, sulfuric acid was added to the above mixture to a concentration of 0.05 wt. % in the final solution, and uniformly dissolved therein to prepare the surface modification solution.

(1) Surface Modification of Polypropylene (PP) Particles

The PP particles used for Example 5 were spherical, having a diameter of 2 mm. The PP particles were immersed in the above surface modification solution and then scooped up to be separated from the solution. The PP particles coated with the treatment solution were put in a container 30 (FIG. 22), and hot wind was vigorously sent into the container, while the particles were stirred to prevent fusing, in a manner similar to that in Example 3. These particles were treated during this step by evaporating the solvent and drying the particles.

Reference Example 4

The untreated PP particles were used for Reference Example 4.

The treated surface conditions were evaluated by the following methods for the PP particles treated for surface modification (Example 5) and untreated particles (Reference Example 4).

(1) Method for Evaluating Surface Modification of the PP Particles a) Evaluation by Immersion in an Aqueous Solution of an Anionic Dye The PP particles, prepared by Example 4 and untreated particles (Reference Example 4) were immersed in a 10% aqueous solution of C.I. Direct Blue 199 dye and then washed with pure water and dried to observe the washed conditions.

b) Results of Evaluation of the Surface Modification of the PP Particles

The following results were obtained by the evaluation tests by immersion in an aqueous solution of an anionic dye.

The PP particles prepared by Example 5 remained lightly cyan in color derived from the dye when immersed in a 10% aqueous solution of C.I. Direct Blue 199 dye and then washed with pure water and dried.

By contrast, the untreated PP particles for Reference Example 4 returned back to the original color of white when immersed in a 10% aqueous solution of C.I. Direct Blue 199 dye and then washed with pure water and dried, indicating that the aqueous dye solution was washed off and that the surface of the particles was not compatible with the solution.

As described above, the PP particles prepared by Example 5, where the particles were surface-modified with poly(dimethyl siloxane) having an amino group as the functional group, remained lightly cyan in color when immersed in the aqueous dye solution and then washed with water, indicating that the amino-modified poly(dimethyl siloxane) attached to the surfaces of the PP particles when the solution containing the amino-modified poly(dimethyl siloxane), acid and alcohol was spread over the surface and dried. In other words, the PP particles were coated with the amino-modified poly(dimethyl siloxane) and surface-modified into the cationic PP particles by the amino group as a cationic group in the amino-modified poly(dimethyl siloxane). The PP particles, becoming cationic by the surface modification, reacted with the anionic dye in the aqueous anionic dye solution to be colored.

In the evaluation of the surface modification of the PP particles, cyan dye was used as the anionic dye. However, the PP particles can be colored differently depending on the dye used. This example used the PP particles of 2 mm in diameter. However, use of finer PP particles expands their surface area, possibly improving a coloring ratio of the dye on the PP particles and hence producing brighter particles.

The colored PP particles can be used as the colorant to be dispersed in ink when these particles are sufficiently fine.

In Example 5, amino-modified poly(dimethyl siloxane) having amino group as a cationic functional group was used for modification of the water-repellent PP surface. However, it is considered that the PP surface can be surface-modified to be anionic when a functional group other than a cationic group, e.g., anionic functional group, is used as the functional substituent for the poly(dimethyl siloxane) section as the skeleton of amino-modified poly(dimethyl siloxane). An anionic functional group may be used together with an alkali substance as the cleavage catalyst. Thus, it is considered that PP can be surface-modified to have desired properties for specific purposes by changing the functional substituent for the poly(dimethyl siloxane) section as the skeleton to be utilized for the surface deposition, depending on surface modification purposes.

Examples 6 and 7

Examples 6 and 7 applied the method of the present invention to a fibrous element of PP fibers for a hydrophilic treatment, in addition to Example 2 for the element of PP/PE fibers. More specifically, the element of PP fibers was formed into a rectangular parallelepiped, 2 by 2 by 3 cm in size, comprising the PP fibers of 2 deniers in size.

Two types of the hydrophilic treatment solution, each having a composition given in Table 5 or 6, were prepared.

TABLE 6

Hydrophilic treatment solution composition

| Components | Contents (wt. %) |
| --- | --- |
| Polyoxyalkylene-poly(dimethyl siloxane) | 0.1 |
| Sulfuric acid | 0.0125 |
| Isopropyl alcohol | 95.8875 |

TABLE 7

Hydrophilic treatment solution composition

| Components | Contents (wt. %) |
| --- | --- |
| Polyoxyalkylene-poly(dimethyl siloxane) | 0.1 |
| Sulfuric acid | 0.0125 |
| Isopropyl alcohol | 40 |
| Pure water | 59.8875 |

The second composition (for Example 7) was prepared by adding specific quantities of isopropyl alcohol and pure water, in this order, to the treatment solution for Example 2 to obtain the above composition. This solution also contained sulfuric acid and polyoxyalkylene-poly(dimethyl siloxane) diluted 4 times.

The fibrous elements of PP fibers were hydrophilically treated in a manner similar to that in Example 2 for the fibrous element of PP/PE fibers with the solution of the first composition containing isopropyl alcohol as the major solvent (Example 6) and with the solution of the second composition (Example 7).

Reference Example 5

The untreated fibrous element of PP/PE fibers was used for Reference Example 5.

The fibrous element of PP/PE fibers for Reference Example 5, having water-repellent surfaces, was surface-modified to obtain hydrophilic surfaces both by Examples 5 and 7, as was the case with the element treated Example 2. In order to evaluate extent of hydrophilic properties, the fibrous elements of Examples 6, 7 and Reference Example 5 were slowly placed on 7 g of an aqueous ink solution (surface energy: 46 dyn/cm) held by a petri dish.

The untreated fibrous element of PP/PE fibers for Reference Example 5 was observed to float on the aqueous ink. By contrast, those for Examples 5 and 6 absorbed the ink from their bottom surfaces. However, the absorption proceeded to clearly different extents. The fibrous element for Example 7 totally absorbed the ink in the petri dish, whereas the one for Example 6 absorbed almost half the ink.

There was no significant difference between the quantity of polyoxyalkylene-poly(dimethyl siloxane) coating the fibrous elements for Examples 6 and 7. The difference between these elements in ink-absorbing capacity conceivably resulted from the difference in the extent of the orientation of the polymer itself.

For example, the polymer coating the PE/PP fibrous element for Example, while generally oriented, was partially disordered. Orientation of the polymer on the element for Example 7, however, was disordered to a much smaller extent.

It is considered that the hydrophilic treatment with polyoxyalkylene-poly(dimethyl siloxane) gives a denser, better oriented coating layer when the treatment solution contains a solvent added to water in addition to isopropyl alcohol. The treatment solution preferably contains at least around 20% of isopropyl alcohol for uniformly wetting the surface. However, the surface may be well coated with a solution containing isopropyl alcohol at below 40% (content of 40% is the level for the solution used in Example 7). Isopropyl alcohol is evaporated faster than other solution components during the solvent evaporation/drying step, more rapidly decreasing in content. When this phenomenon is taken into consideration, the surface can be coated well with a solution containing isopropyl alcohol at below 40%. Moreover, isopropyl alcohol content of below 40% is preferable from the viewpoint of industrial safety.

This invention provides an innovative surface modification method capable of performing a desired surface modification based on the new mechanism, which do not use ozone, ultraviolet ray or the like for forming free radicals to process an element for improved properties, nor depends on a primer coating (e.g., coating of a silane coupling agent), which may be uneven. This invention also provides a treatment solution for the surface modification method, the element produced by the method, and the surface structure itself obtained by the surface modification.

In particular, the surface modification method of the present invention tries to give an element surface desired functions and/or characteristics of the surface-modifying polymer by orienting the functional group contained in the polymer at the molecular level. It can effectively modify an element with complex surfaces, e.g., an element's inner wall surfaces of complex shapes having hollows or voids. Modification by orientation at the molecular level can greatly reduce a required quantity of the modifier. For example, the present invention can uniformly and continuously hydrophilically treat surfaces of polyolefin-based resins finding wide use, e.g., polyethylene and polypropylene.

What we claim is:

1. A method for treating at least a part of a surface of an object by providing it with a functional group, the method comprising the steps of:
    providing a liquid containing fractionalized products, which are obtained by cleaving a polymer comprising a first part having the functional group and a second part having an interfacial energy different from that of the functional group and approximately equal to a surface energy of the part of the surface, and which comprise the first part and the second part;
    orienting the second part of the fractionalized products toward the part of the surface and orienting the first part in a direction different from the part of the surface to form oriented fractionalized products;
    applying the liquid containing the oriented fractionalized products to at least the part of the surface of the object; and
    at least partially polymerizing the oriented fractionalized products with one another by condensation polymerization.

2. The method according to claim 1, wherein the condensation polymerization is initiated by heating.

3. The method according to claim 1, wherein the functional group is a hydrophilic group.

4. The method according to claim 2, wherein the functional group is a hydrophilic group.

5. The method according to claim 1, wherein the object has an inner space and the part of the surface is on an inner face of the inner space.

6. The method according to claim 1, wherein the object is a fiber.

7. The method according to claim 1, wherein the object is a particle.

8. The method according to claim 1, wherein the object has a circular part composed of a curved plane forming an outer circumference of a cross-section with a closed circular shape and the part of the surface is on the outer circumferential face of the circular part, and wherein at least the outer circumference of the circular part is coated with a film containing a polymer formed by at least partially polymerizing the oriented fractionalized products with one another by condensation polymerization.

9. The method according to claim 1, wherein the functional group is provided by an organosiloxane polymer having the functional group.

10. The method according to claim 1, wherein the part of the surface is composed of an olefinic resin and the functional group is provided by a polyalkylsiloxane polymer having the functional group.

11. The method according to claim 9, wherein the functional group is a polyalkylene oxide.

12. The method according to claim 11, wherein the organosiloxane polymer is (polyoxyalkylene)-poly(dimethylsiloxane).

* * * * *

UNITED STATES PATENT AND TRADEMARK OFFICE
CERTIFICATE OF CORRECTION

PATENT NO. : 7,425,348 B2
APPLICATION NO. : 11/125205
DATED : September 16, 2008
INVENTOR(S) : Mikio Sanada et al.

It is certified that error appears in the above-identified patent and that said Letters Patent is hereby corrected as shown below:

TITLE PAGE AT (57) ABSTRACT

Line 9, "objet" should read --object--.

COLUMN 8

Line 15, "FIG. 10C. FIG. 10D" should read --FIG. 10C and FIG. 10D--;
Line 32, "schematic" should read --schematic illustration--; and
Line 48, "magnified" should read --magnified portions of--.

COLUMN 10

Line 21, "surface;" should read --surface--.

COLUMN 12

Line 61, "60EC)" should read --60 °C)--.

COLUMN 15

Line 20, "Silysulfuric" should read --Silylsulfuric--.

COLUMN 16

Line 11, "embodiment" should read --embodiments--; and
Line 50, "liquid-Repellent" should read --liquid-repellent--.

COLUMN 17

Line 30, "characteristics" should read --characteristics are--; and
Line 60, "60EC)" should read --60 °C)--.

COLUMN 18

Line 53, "formula (1):" should read --formula (2):--.

COLUMN 19

Line 4, "formula (1)" should read --formula (2)--; and
Line 57, "60EC" should read --60 °C--.

UNITED STATES PATENT AND TRADEMARK OFFICE
CERTIFICATE OF CORRECTION

| | | |
|---|---|---|
| PATENT NO. | : 7,425,348 B2 | |
| APPLICATION NO. | : 11/125205 | |
| DATED | : September 16, 2008 | |
| INVENTOR(S) | : Mikio Sanada et al. | |

It is certified that error appears in the above-identified patent and that said Letters Patent is hereby corrected as shown below:

COLUMN 20

Line 2, "the," should read --the--.

COLUMN 21

Line 30, "the" (first occurrence) should be deleted.

COLUMN 22

Line 17, "60EC" should read --60 °C--;
    Line 49, "Examples" should read --Example--; and
    Line 55, "Examples" should read --Example--.

COLUMN 26

Line 44, "between" should read --of--; and
    Line 51, "60EC" should read --60 °C--.

COLUMN 28

Line 42, "Example 4" should read --Example 5--.

COLUMN 29

Line 44, "Table 5 or 6," should read --Table 6 or 7,--.

UNITED STATES PATENT AND TRADEMARK OFFICE
CERTIFICATE OF CORRECTION

PATENT NO. : 7,425,348 B2
APPLICATION NO. : 11/125205
DATED : September 16, 2008
INVENTOR(S) : Mikio Sanada et al.

It is certified that error appears in the above-identified patent and that said Letters Patent is hereby corrected as shown below:

<u>COLUMN 30</u>

Line 28, "5 and 6" should read --6 and 7--;
Line 40, "for Example" should be deleted; and
Line 62, "do" should read --does--.

Signed and Sealed this

Seventeenth Day of February, 2009

JOHN DOLL
*Acting Director of the United States Patent and Trademark Office*